United States Patent
Chae et al.

(10) Patent No.: US 7,333,161 B2
(45) Date of Patent: Feb. 19, 2008

(54) FORMING METHOD OF LIQUID CRYSTAL LAYER USING INK JET SYSTEM

(75) Inventors: Goe-Sung Chae, Incheon (KR); Jae-Kyun Lee, Gyeonggi-do (KR); Yong-Sup Hwang, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/961,081

(22) Filed: Oct. 12, 2004

(65) Prior Publication Data

US 2005/0046784 A1 Mar. 3, 2005

Related U.S. Application Data

(62) Division of application No. 10/029,167, filed on Dec. 28, 2001, now Pat. No. 6,819,383.

(30) Foreign Application Priority Data

May 29, 2001 (KR) .............................. 2001-29811

(51) Int. Cl.
G02F 1/136 (2006.01)
G02F 1/1343 (2006.01)

(52) U.S. Cl. .................... 349/43; 349/42; 349/139; 349/143

(58) Field of Classification Search ............... 349/42, 349/43, 139, 142, 143
See application file for complete search history.

(56) References Cited

U.S. PATENT DOCUMENTS 5,668,650 A * 9/1997 Mori et al. ............. 349/42
5,726,461 A * 3/1998 Shimada et al. ........... 257/59
5,757,450 A * 5/1998 Fujii et al. ................ 349/106
5,835,177 A * 11/1998 Dohjo et al. .............. 349/147
5,870,157 A 2/1999 Shimada et al.
5,880,797 A 3/1999 Yamada et al.
5,886,761 A * 3/1999 Sasaki et al. ............. 349/122
5,946,060 A * 8/1999 Nishiki et al. ............. 349/48
6,226,061 B1 5/2001 Tagusa
6,310,669 B1 10/2001 Kobayashi et al.
6,323,051 B1 * 11/2001 Shimada ................... 438/30
6,449,024 B1 9/2002 Hirakata et al.
6,509,939 B1 1/2003 Lee et al.
6,573,955 B2 6/2003 Murade
6,583,841 B2 6/2003 Youn et al.

* cited by examiner

*Primary Examiner*—Michael H. Caley
(74) *Attorney, Agent, or Firm*—Birch, Stewart, Kolasch & Birch, LLP

(57) ABSTRACT

An array substrate includes a substrate, a gate line disposed along a first direction on the substrate, and a common line is parallel to the gate line, the common line being of the same material as the gate line. A gate insulating layer is on the gate and common lines, a semiconductor layer is on the gate insulating layer and a transparent pixel electrode includes a drain electrode portion. The drain electrode portion overlaps the semiconductor. A passivation layer includes a first contact hole and an open portion over the pixel and source electrodes, the first contact hole exposing the source electrode and the open portion exposing the pixel electrode, respectively. A data line is disposed along a second direction on the passivation layer, and the data line connected to the source electrode through the first contact hole and crossing the gate line.

22 Claims, 21 Drawing Sheets

FORMING METHOD OF LIQUID CRYSTAL LAYER USING INK JET SYSTEM

CROSS-REFERENCES TO RELATED APPLICATIONS

This nonprovisional application is a Rule 1.53(b) divisional application of application Ser. No. 10/029,167, filed Dec. 28, 2001, now U.S. Pat. No. 6,819,383 which claims priority under 35 U.S.C. § 119(a) of Patent Application No. 2001-29811 filed in Korea on May 29, 2001, the entirety of which is herein incorporated by reference.

BACKGROUND OF THE INVENTION

1. Field of the Invention

The present invention relates to a liquid crystal display device, and more particularly to an array substrate having a high storage capacitance and a high aperture ratio, and a fabricating method thereof.

2. Description of the Background Art

A conventional liquid crystal display (LCD) device uses optical anisotropy and polarization properties of liquid crystal molecules. The liquid crystal molecule has a definite orientational order in alignment resulting from its thin and long shape. The alignment direction of the liquid crystal molecule can be controlled by applying an electric field to the liquid crystal molecule. In other words, as the alignment direction of the electric field is changed, the alignment of the liquid crystal molecules also changes. Images are displayed since the incident light is refracted to the orientation of the liquid crystal molecules due to the optical anisotropy of the aligned liquid crystal molecules.

Of the different types of known LCDs, active matrix LCDs (AM-LCDs), which have thin film transistors and pixel electrodes arranged in a matrix form, are the subject of significant research and development because of their high resolution and superiority in displaying moving images.

FIG. 1 is a schematic cross-sectional view partially showing a liquid crystal panel of an LCD device of the background art. In FIG. 1, the liquid crystal panel 20 has an upper substrate 2, referred as a color filter substrate, and a lower substrate 1, referred as an array substrate. The upper and lower substrates 2 and 1 are facing and spaced apart from each other and a liquid crystal layer 10 is interposed therebetween. A black matrix 9 that prevents light leakage and a color filter 8 that selectively transmits light are formed on the inner surface of the upper substrate 4 with an overlapped portion. A common electrode 12 that applies a voltage to the liquid crystal layer 10 is formed on the black matrix 9 and the color filter 8. On the other hand, a pixel electrode 14 that applies a voltage to the liquid crystal layer 10 with the common electrode 12 of the upper substrate 4 is formed at the top of the lower substrate 1. A thin film transistor (TFT) "T" that is a switch of the voltage applied to the pixel electrode 14 is formed on the lower substrate 2.

A storage capacitor "Cst" that keeps the voltage applied to the liquid crystal layer 10 for one frame is formed at a pixel region where the pixel electrode 14 is disposed. The types of the storage capacitor "Cst" can be divided into a previous gate type and a common type. In the previous gate type, the pixel electrode and the previous gate line has an overlapping area and this overlapping area is used as the storage capacitor. In the common type, a common line is formed at the pixel region and the storage capacitor is formed between the common line and the pixel electrode. The previous gate type has advantages in aperture ratio and yield, and the common type has advantages in display quality.

Recently, according to the concentration on LCD devices with high definition and high display quality, storage capacitor of a complex type of the previous gate and the common types is being researched.

FIG. 2 is a schematic plan view partially showing an array substrate of an LCD device of the background art having a common type storage capacitor. In FIG. 2, a gate line 26 having a gate electrode 22 is formed along a row direction and a common line 24 parallel to the gate line 26 is spaced apart from the gate line 26. A semiconductor layer 30 is formed on the gate electrode 22. A source electrode 32 and a drain electrode 34 overlapping the semiconductor layer 30 are spaced apart from each other. A data line 36 connected to the source electrode 32 is formed along a column direction and crossing the gate and common lines 26 and 24. A pixel electrode 46 is formed at a pixel region defined by the gate and data lines 26 and 36 and a storage electrode 38 is formed in the pixel region.

The storage electrode 38 is made of the same material as the data line 36 and is disposed over the common line 24 with a first area. A TFT includes the gate electrode 22, the semiconductor layer 30 and the source and drain electrodes 32 and 34. The pixel electrode 46 is connected to the drain electrode 34 through a first contact hole 42 and connected to the storage electrode 38 through a second contact hole 44. A gate insulating layer is interposed between the common line and the storage electrode 24 and 38 and a passivation layer is interposed between the storage and the pixel electrodes 38 and 46. The passivation layer includes first and second contact holes 42 and 44, and protects the TFT from exterior damage.

In the above-mentioned structure, a storage capacitor "Cst" is formed between the common line 24 and the storage electrode 38 and between the common line 24 and the pixel electrode 46. The capacitance is defined by the following relationship:

$$C = \epsilon A/d$$

where C is capacitance, $\epsilon$ is permittivity of the interposed dielectric material, A is area of the electrode of the capacitor and d is distance between the electrodes of the capacitor.

Since the gate insulating layer is thinner than the passivation layer, the capacitance between the common line 24 and the storage electrode 38 is larger than that between the common line 24 and the pixel electrode 46. Therefore, the storage capacitance is increased by adding the storage electrode 38. However, since the storage electrode 38 is made of opaque metallic material, which is the same material of the data line 36, an aperture ratio is reduced by adding the opaque storage electrode 38.

FIGS. 3 to 12 are schematic plan views and their schematic cross-sectional views showing forming process of an array substrate for an LCD device of the background art. In these processes, deposition, photolithography and etching are repeated to form the array substrate. FIG. 3 is a schematic plan view showing a forming process of an array substrate for an LCD device of the background art. FIG. 4 is a schematic cross-sectional view showing a forming process of an array substrate for an LCD device of the background art. In FIG. 3 and FIG. 4, a gate line 26 having a gate electrode 22 and a common line 24 are formed on a substrate 1 along a row direction. The common line 24 parallel to the gate line 26 is spaced apart from the gate line 26. A double metallic layer including aluminum (Al) is mainly used as the gate and common lines 26 and 24.

FIG. 5 is a schematic plan view showing a forming process of an array substrate for an LCD device of the background art. FIG. 6 is a schematic cross-sectional view showing a forming process of an array substrate for an LCD device of the background art. In FIG. 5 and FIG. 6, after a gate insulating layer 28 is formed on the entire surface of the substrate 1 having the gate and common lines 26 and 24, an active layer 30a of amorphous silicon (a-Si) and an ohmic contact layer 30b of doped amorphous silicon (doped a-Si) are subsequently formed on the gate insulating layer 28 over the gate electrode 22 to form a semiconductor layer 30. The ohmic contact layer 30b can reduce the contact resistance between the active layer 30a and a following metal layer since an ionic doping process increases the carrier mobility of the ohmic contact layer 30b.

FIG. 7 is a schematic plan view showing a forming process of an array substrate for an LCD device of the background art. FIG. 8 is a schematic plan cross-sectional view showing a forming process of an array substrate for an LCD device of the background art. In FIG. 7 and FIG. 8, a data line 36 having a source electrode 32, a drain electrode 34 spaced apart from the source electrode 32 and a storage electrode 38 are formed on the substrate having the semiconductor layer 30. The data line 36 crossing the gate and common lines 26 and 24 is disposed along a column direction. The storage electrode 38 overlapping the common line 24 is disposed in the pixel region. Chemical-resistant metal such as molybdenum (Mo) is mainly used as the data line 36, the drain electrode 34 or the storage electrode 38. In this forming process of the source and drain electrodes 32 and 34, the ohmic contact layer 31 between the source and drain electrodes 32 and 34 is eliminated so that a channel ch can be formed by exposing the active layer 30a.

FIG. 9 is a schematic plan view showing a forming process of an array substrate for an LCD device of the background art. FIG. 10 is a schematic cross-sectional view showing a forming process of an array substrate for an LCD device of the background art. In FIG. 9 and FIG. 10, a passivation layer 40 having a first contact hole 42 and a second contact hole 44 is formed on the entire surface of the substrate. The first and second contact holes 42 and 44 expose the drain and storage electrodes 34 and 38, respectively.

FIG. 11 is a schematic plan cross-sectional view showing a forming process of an array substrate for an LCD device of the background art. FIG. 12 is a schematic view showing a forming process of an array substrate for an LCD device of the background art. In FIG. 11 and FIG. 12, a pixel electrode 46 is formed on the passivation layer 40 and connected to the drain and storage electrodes 34 and 38 through the first and second contact holes 42 and 44, respectively. The pixel electrode 46 is made of a transparent conductive material such as indium tin oxide (ITO) or indium zinc oxide (IZO).

The storage electrode 38 connected to the pixel electrode 46 through the second contact hole 44 forms a storage capacitor "Cst" with the common line 24. Since the distance between the common line 24 and the storage electrode 38 is longer than that between the common line 24 and the pixel electrode 46, the storage capacitance can be increased. However, since the region "A" of the storage electrode 38 of opaque metal also reduces the aperture ratio, it becomes difficult to increase the aperture ratio and the storage capacitance.

SUMMARY OF THE INVENTION

The present invention overcomes the shortcomings associated with the background art and achieves other advantages not realized by the background art.

An object of the present invention is to provide a liquid crystal display device that substantially obviates one or more of the aforementioned problems of the background art.

An object of the present invention is to provide an array substrate of a liquid crystal display device that has a high aperture ratio and a high storage capacitance.

An object of the present invention is to provide a method of manufacturing an array substrate of a liquid crystal display device that has a high aperture ratio and a high storage capacitance.

These and other aspects of the present invention are accomplished by an array substrate of a liquid crystal display device, comprising a substrate; a gate line disposed along a first direction on the substrate; a common line parallel to the gate line and spaced apart from the gate line, the common line made of the same material as the gate line; a gate insulating layer on the gate line and the common line; a semiconductor layer on the gate insulating layer; a pixel electrode of transparent conductive material including a drain electrode portion, said drain electrode portion overlapping the semiconductor layer; a source electrode of transparent conductive material spaced apart from the drain electrode portion; a passivation layer including a first contact hole and an open portion over the pixel and source electrodes, the first contact hole exposing the source electrode and the open portion exposing the pixel electrode, respectively; and a data line disposed along a second direction on the passivation layer, the data line connected to the source electrode through the first contact hole and crossing the gate line.

These and other aspects of present invention are further accomplished by an array substrate of a liquid crystal display device, comprising a substrate; a common electrode on the substrate; a gate line disposed along a first direction on the substrate; a common line parallel to the gate line and spaced apart from the gate line, the common line being made of the same material as the gate line and contacting the common electrode; a gate insulating layer on the gate line and the common line; a semiconductor layer on the gate insulating layer; a pixel electrode of transparent conductive material including a drain electrode portion, the drain electrode portion overlapping the semiconductor layer; a source electrode of transparent conductive material spaced apart from the drain electrode portion; a passivation layer including a first contact hole and an open portion, the first contact hole exposing the source electrode and the open portion exposing the pixel electrode, respectively; and a data line disposed along a second direction on the passivation layer, the data line connected to the source electrode through the first contact hole and crossing the gate line.

These and other aspects of present invention are further accomplished by an array substrate of a liquid crystal display device, comprising a substrate; a gate line disposed along a first direction on the substrate, the gate line including a storage electrode; a gate insulating layer on the gate line; a semiconductor layer on the gate insulating layer; a pixel electrode of transparent conductive material including a drain electrode portion, the drain electrode portion overlapping the semiconductor layer and the pixel electrode overlapping the gate line, respectively; a source electrode of transparent conductive material spaced apart from the drain electrode portion; a passivation layer including a first contact hole and an open portion, the first contact hole exposing the source electrode and the open portion exposing the pixel electrode, respectively; and a data line disposed along a second direction on the passivation layer, the data line connected to the source electrode through the first contact hole and crossing the gate line.

These and other aspects of present invention are further accomplished by a fabricating method of an array substrate of a liquid crystal display device, comprising forming a gate line disposed along a first direction and a common line parallel to the gate line on a substrate, wherein the gate and common lines are spaced apart from each other; forming a gate insulating layer on the gate line and the common line; forming a semiconductor layer on the gate insulating layer; forming a source electrode and a pixel electrode of transparent conductive material, the pixel electrode including a drain electrode portion, the drain electrode portion overlapping the semiconductor layer and the source electrode being spaced apart from the drain electrode portion; forming a passivation layer including a first contact hole and an open portion, the first contact hole exposing the source electrode and the open portion exposing the pixel electrode, respectively; and forming a data line disposed along a second direction on the passivation layer, the data line connected to the source electrode through the first contact hole and crossing the gate line.

These and other aspects of present invention are further accomplished by a fabricating method of an array substrate of a liquid crystal display device, comprising forming a common electrode on a substrate, forming a gate line disposed along a first direction and a common line parallel to the gate line, the common line spaced apart from the gate line and contacting the common electrode; forming a gate insulating layer on the gate line and the common line; forming a semiconductor layer on the gate insulating layer; forming a source electrode and a pixel electrode of transparent conductive material, the pixel electrode including a drain electrode portion, the drain electrode portion overlapping the semiconductor layer and the source electrode spaced apart from the drain electrode portion; forming a passivation layer including a first contact hole and an open portion, the first contact hole exposing the source electrode and the open portion exposing the pixel electrode, respectively; and a data line disposed along a second direction on the passivation layer, the data line connected to the source electrode through the first contact hole and crossing the gate line.

These and other aspects of present invention are further accomplished by a fabricating method of an array substrate of a liquid crystal display device, comprising forming a gate line disposed along a first direction on a substrate, the gate line including a storage electrode; forming a gate insulating layer on the gate line; forming a semiconductor layer on the gate insulating layer; forming a source electrode and a pixel electrode of transparent conductive material, the pixel electrode including a drain electrode portion, the source electrode spaced apart from the drain electrode portion, the drain electrode portion overlapping the semiconductor layer and the pixel electrode overlapping the gate line, respectively; forming a passivation layer including a first contact hole and an open portion, the first contact hole exposing the source electrode and the open portion exposing the pixel electrode, respectively; and forming a data line disposed along a second direction on the passivation layer, the data line connected to the source electrode through the first contact hole and crossing the gate line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention will hereinafter be described with reference to the accompanying drawings. In the preferred embodiments of the present invention described hereinafter, source, drain and pixel electrodes are formed of a transparent conductive material and a data line is formed after the forming of a passivation layer.

First Embodiment

Figure 13:
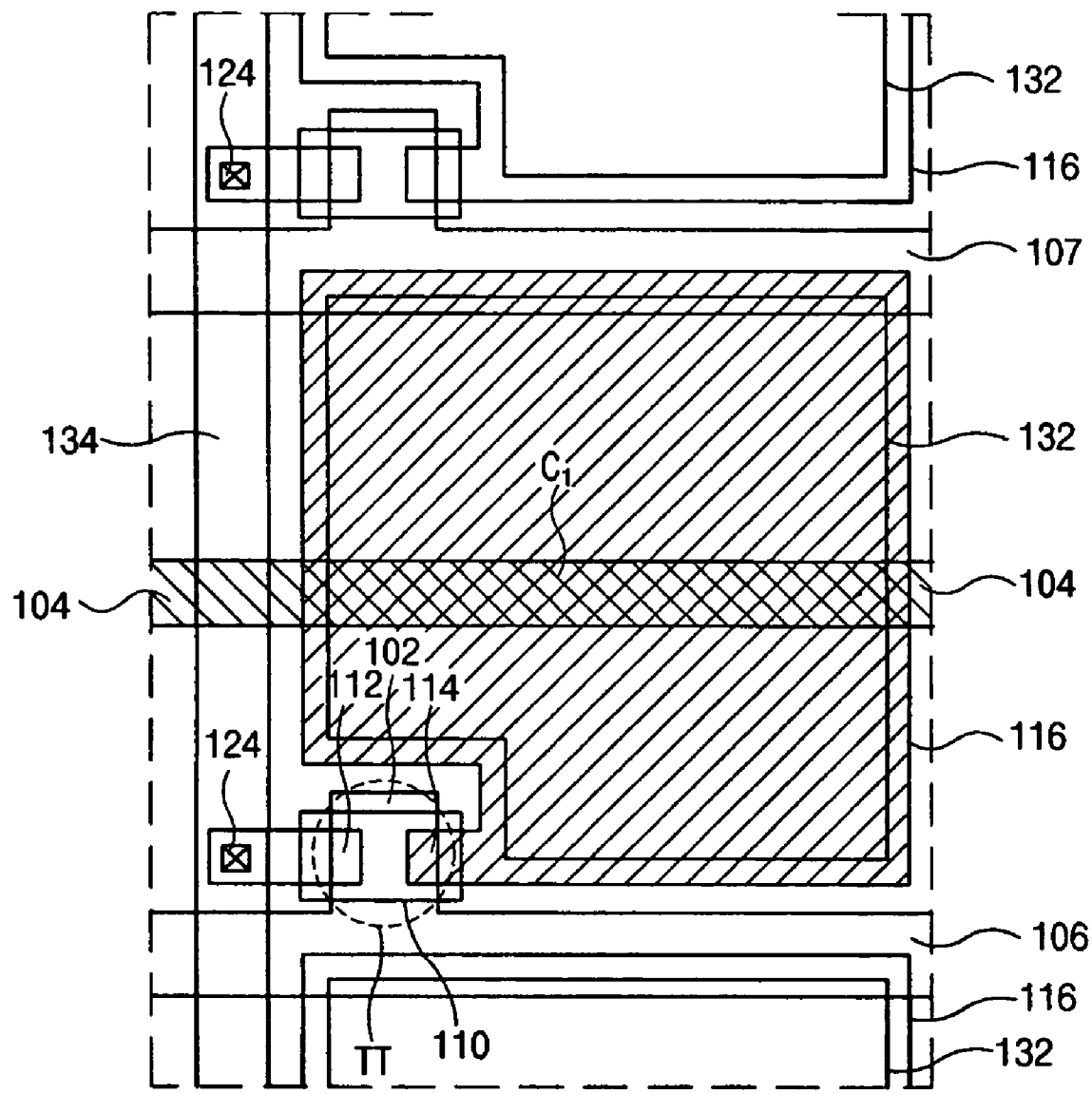
FIG. 13 is a schematic plan view of an array substrate for an LCD device according to a first embodiment of the present invention.

FIG. 13 is a schematic plan view of an array substrate for an LCD device according to a first embodiment of the present invention. In FIG. 13, a gate line 106 having a gate electrode 102 is formed along a row direction and a common line 104 parallel to the gate line 106 is spaced apart from the gate line 106. The common line 104 is made of the same material as the gate line 106. A semiconductor layer 110 is formed on the gate electrode 102. A source electrode 112 and a drain electrode portion 114 overlapping the semiconductor layer 110 are spaced apart from each other. A pixel electrode 116, including the drain electrode portion 114, is formed at a pixel region defined by the gate line 106 and a data line 134. The data line 134 is formed along a column direction and crosses the gate and common lines 106 and 104.

A passivation layer (not shown) including a first contact hole 124 and an open portion 132 is interposed between the source and pixel electrodes 112 and 116 and the data line 134. The data line 134 is connected to the source electrode 112 through the first contact hole. The open portion 132 exposes the pixel electrode 116 to prevent reduction of the electric field of the liquid crystal layer.

The source and pixel electrodes 112 and 116 and the drain electrode portion 114 are made of transparent conductive material such as indium tin oxide (ITO), indium zinc oxide (IZO) and indium tin zinc oxide (ITZO); however, ITO is preferably used due to its desirable contact property with a metal of the exterior circuit. However, since the contact property of the transparent material with a semiconductor material is undesirable, the semiconductor layer 110 has a buffer contacting layer of titanium (TI) or chromium (Cr) so that the contact resistance is minimized between transparent conductive material and semiconductor. The pixel electrode 116 overlaps a previous gate line 107 to increase the aperture ratio.

In the first embodiment, a storage capacitor "C1" is formed between the common line 104 and the pixel electrode 116, and only the gate insulating layer, which is thinner than the passivation layer, is interposed therebetween. Therefore, adequate storage capacitance can be achieved without an additional storage electrode of opaque metal and the aperture ratio is improved.

Figure 1:
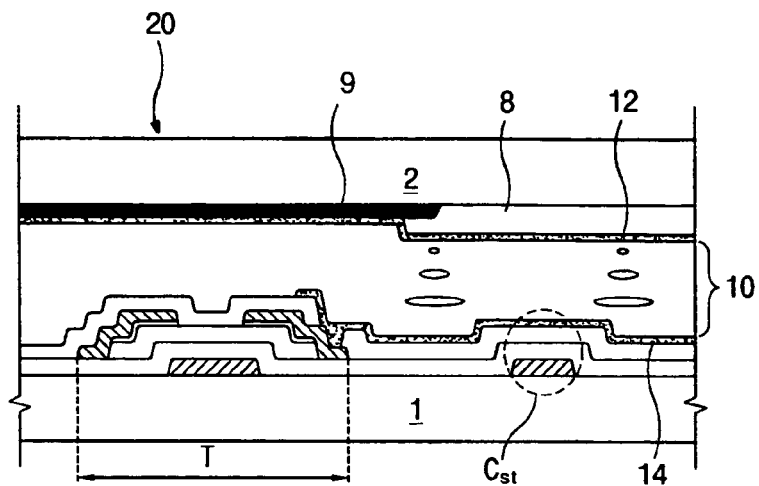
FIG. 1 is a schematic cross-sectional view partially showing a liquid crystal panel of an LCD device of the background art.
Figure 2:
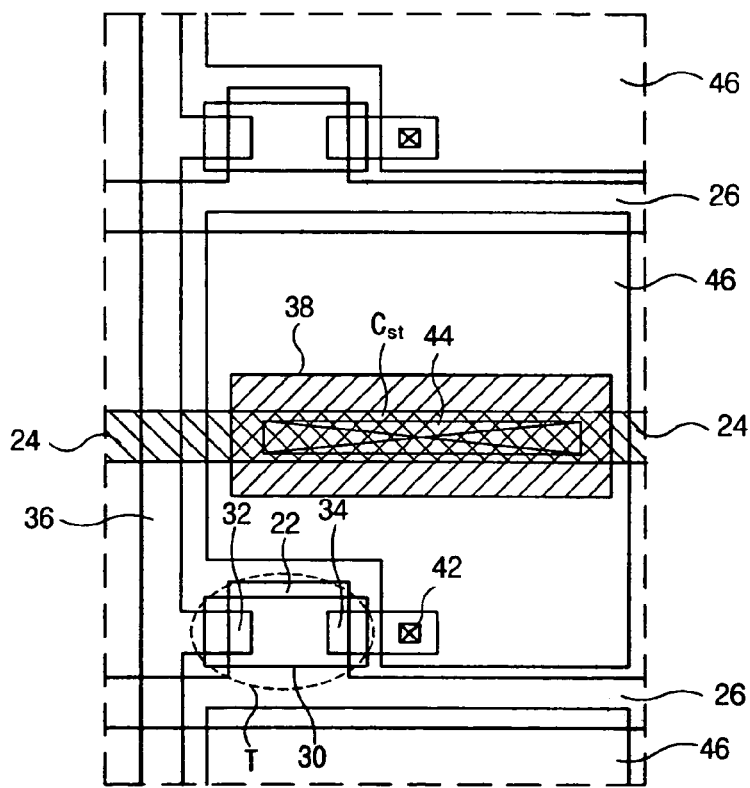
FIG. 2 is a schematic plan view partially showing an array substrate of an LCD device of the background art having a common type storage capacitor.
Figure 3:
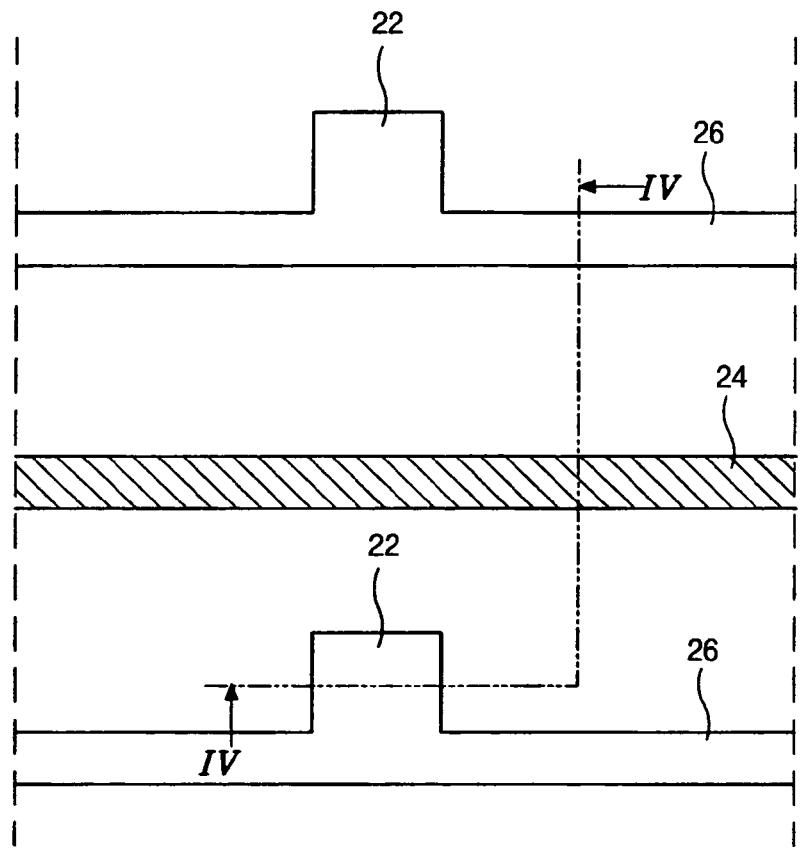
FIG. 3 is a schematic plan view showing a forming process of an array substrate for an LCD device of the background art.
Figure 4:
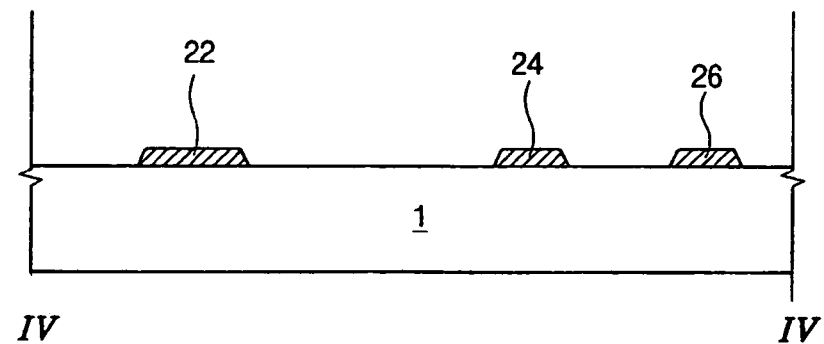
FIG. 4 is a schematic cross-sectional view showing a forming process of an array substrate for an LCD device of the background art.
Figure 5:
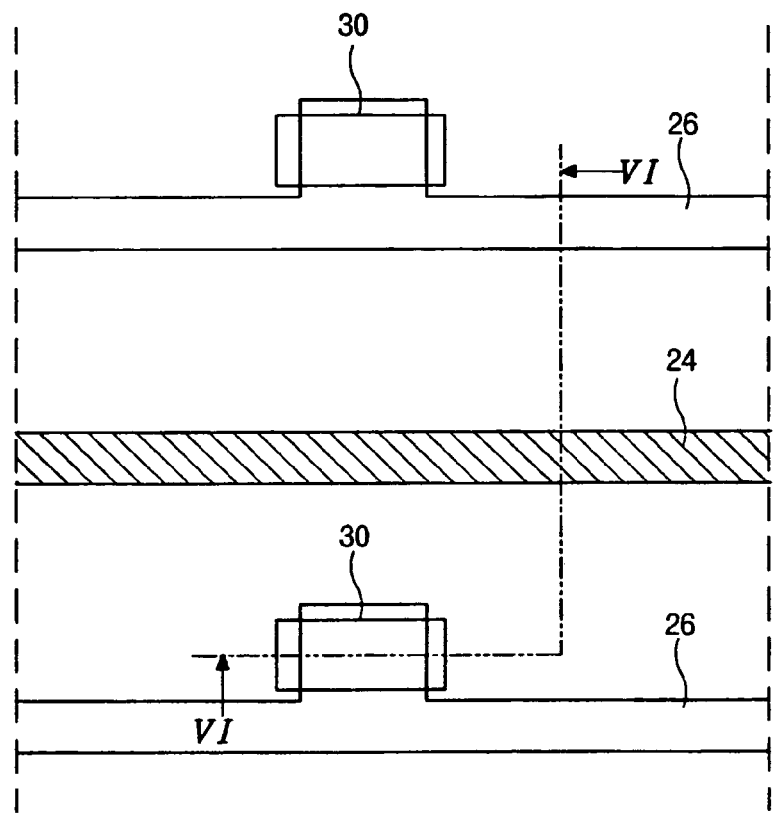
FIG. 5 is a schematic plan view showing a forming process of an array substrate for an LCD device of the background art.
Figure 6:
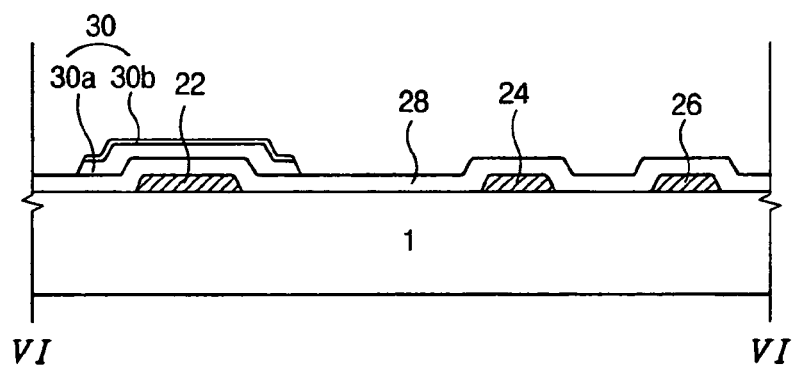
FIG. 6 is a schematic cross-sectional view showing a forming process of an array substrate for an LCD device of the background art.
Figure 7:
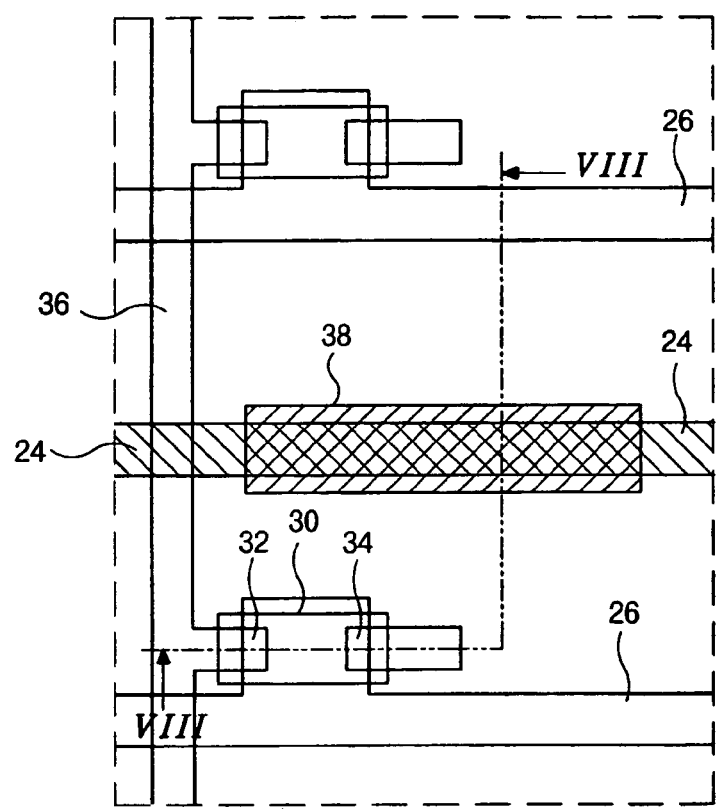
FIG. 7 is a schematic plan view showing a forming process of an array substrate for an LCD device of the background art.
Figure 8:
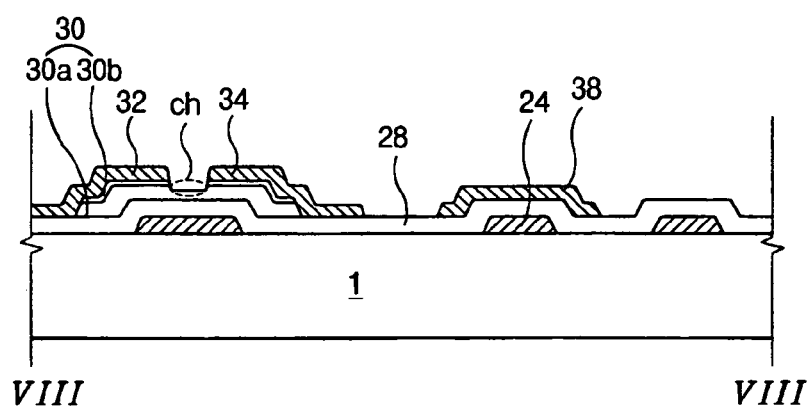
FIG. 8 is a schematic plan cross-sectional view showing a forming process of an array substrate for an LCD device of the background art.
Figure 9:
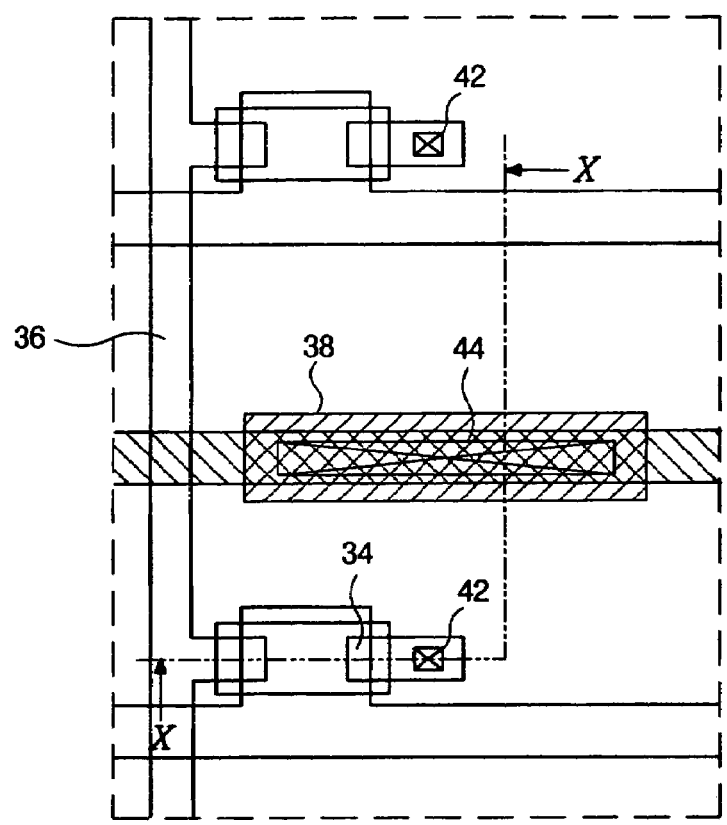
FIG. 9 is a schematic plan view showing a forming process of an array substrate for an LCD device of the background art.
Figure 10:
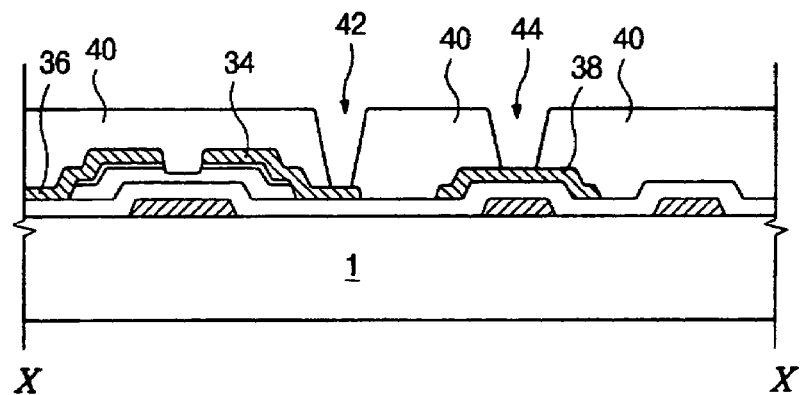
FIG. 10 is a schematic cross-sectional view showing a forming process of an array substrate for an LCD device of the background art.
Figure 11:
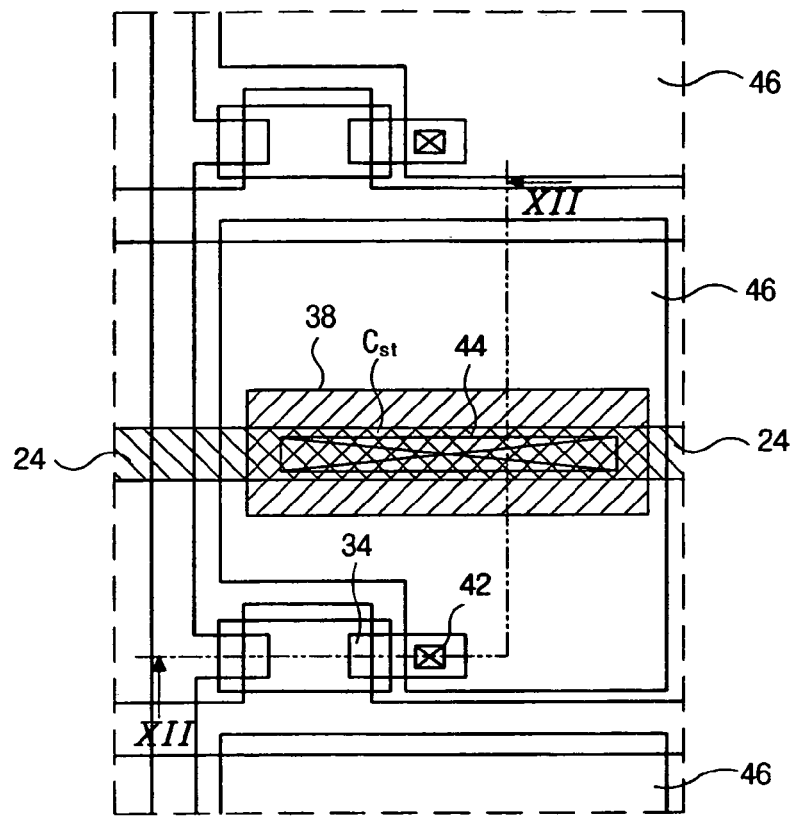
FIG. 11 is a schematic plan cross-sectional view showing a forming process of an array substrate for an LCD device of the background art.
Figure 12:
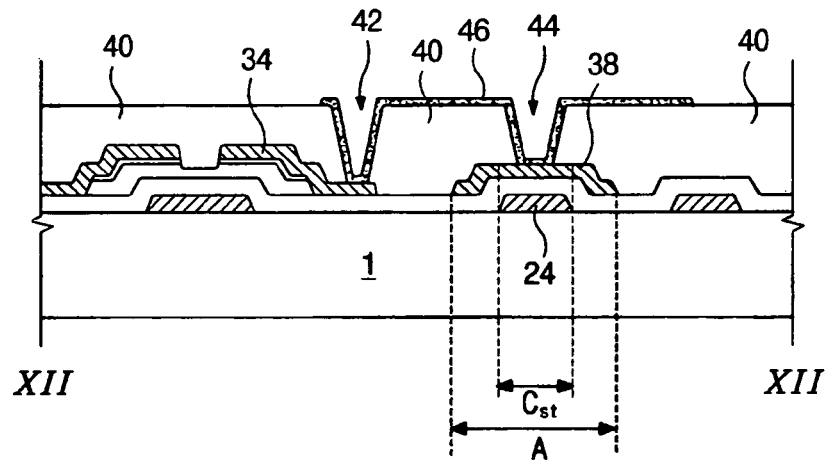
FIG. 12 is a schematic view showing a forming process of an array substrate for an LCD device of the background art.

The TFT "TT" of the first embodiment is distinguished from the conventional TFT "T" (of FIG. 2). The TFT "TT" of the first embodiment has the buffer contacting layer on the semiconductor layer 110 and the source electrode 112 and drain electrode portion 114 are made of transparent conductive material. Moreover, the drain electrode portion 114 and pixel electrode 116 are formed as one pattern and the source electrode 112 is connected to the data line 134 through the first contact hole 124.

Figure 14:
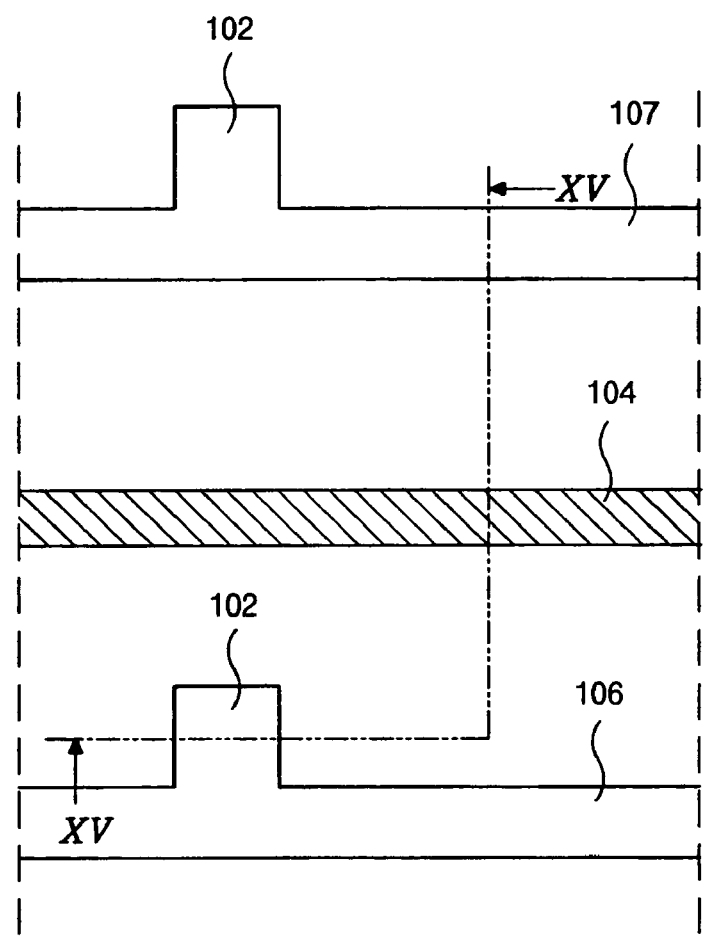
FIG. 14 is a schematic plan view showing a forming process of an array substrate for an LCD device according to a first embodiment of the present invention.
Figure 15:
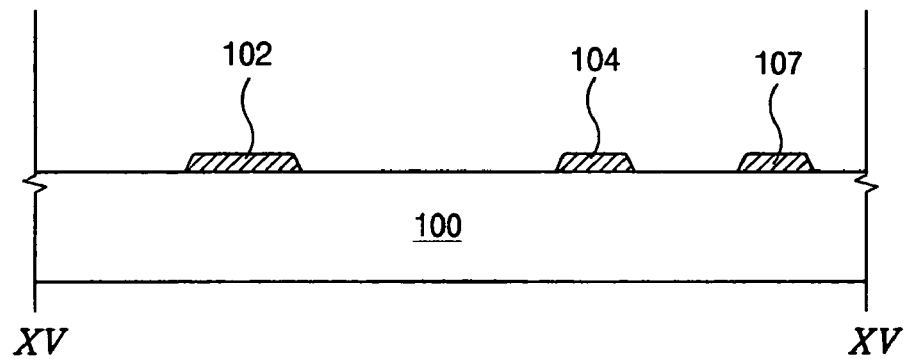
FIG. 15 is a schematic cross-sectional view showing a forming process of an array substrate for an LCD device according to a first embodiment of the present invention.

FIG. 14 to FIG. 23 are schematic plan views and schematic cross-sectional views showing forming processes of an array substrate for an LCD device according to a first embodiment of the present invention. FIG. 14 is a schematic plan view showing a forming process of an array substrate for an LCD device according to a first embodiment of the present invention. FIG. 15 is a schematic cross-sectional view showing a forming process of an array substrate for an LCD device according to a first embodiment of the present invention. In FIG. 14 and FIG. 15, a gate line 106 having a gate electrode 102 and a common line 104 are formed on a substrate 100 along a row direction. The common line 104 parallel to gate line 106 is spaced apart from the gate line 106. A double metallic layer of aluminum neodymium and molybdenum (AlNd/Mo) can be used as the gate and common lines 106 and 104.

Figure 16:
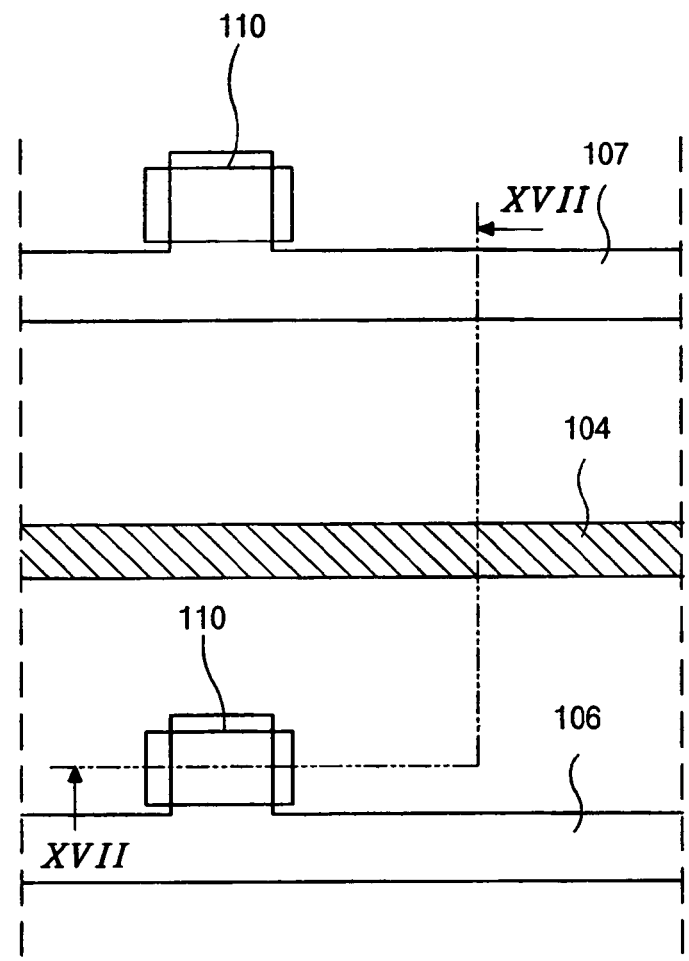
FIG. 16 is a schematic plan view showing a forming process of an array substrate for an LCD device according to a first embodiment of the present invention.
Figure 17:
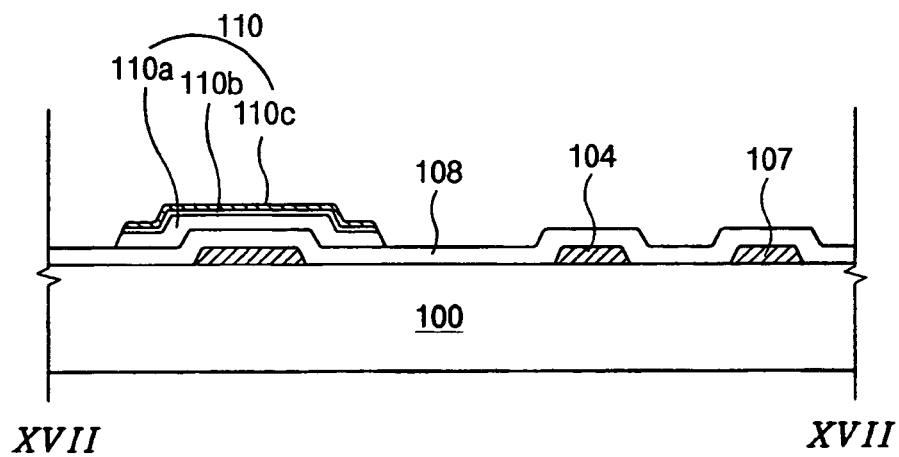
FIG. 17 is a schematic cross-sectional view showing a forming process of an array substrate for an LCD device according to a first embodiment of the present invention.

FIG. 16 is a schematic plan view showing a forming process of an array substrate for an LCD device according to a first embodiment of the present invention. FIG. 17 is a schematic cross-sectional view showing a forming process of an array substrate for an LCD device according to a first embodiment of the present invention.

In FIG. 16 and FIG. 17, a gate insulating layer 108 is first formed on the entire surface of the substrate 100 having the gate and common lines 106 and 104. Next, an active layer 110a of amorphous silicon (a-Si), an ohmic contact layer 110b of doped amorphous silicon (doped a-Si) and a buffer contacting layer 110c of titanium (Ti) or chromium (Cr) are subsequently formed on the gate insulating layer 108 over the gate electrode 102 to form a semiconductor layer 110 with an additional buffer layer.

In this forming process, after subsequently depositing silicon nitride (SiNx) film, a-Si film and doped a-Si film on the substrate 100 having the gate and common lines 106 and 104 in the PECVD (plasma enhanced chemical vapor deposition) apparatus, one of Ti and Mo is deposited on the entire surface of the substrate 100 in the sputter apparatus. Then, the active layer 110a, the ohmic contact layer 110b and the buffer contacting layer 110c are formed by etching the a-Si film, doped a-Si film and Ti or Mo film, respectively. The buffer contacting layer 100c is adopted to improve the contact property between the ohmic contact layer 110b and a drain electrode portion 114 of transparent conductive material.

Figure 18:
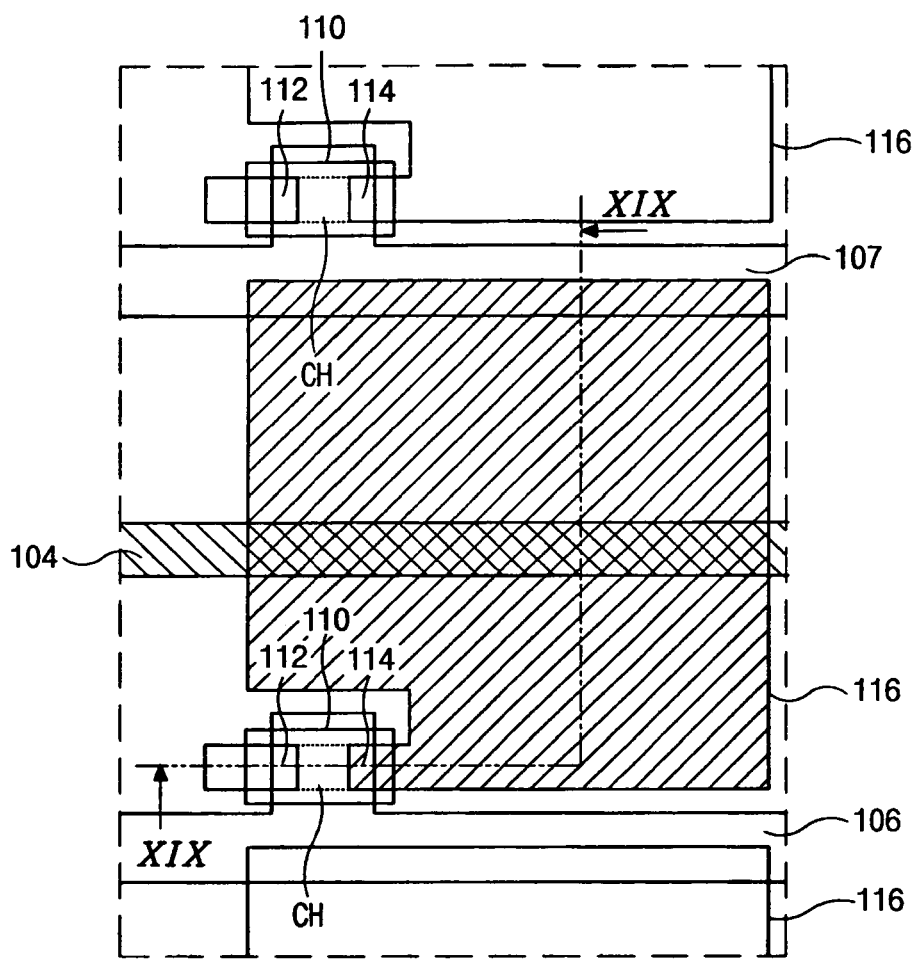
FIG. 18 is a schematic plan view showing a forming process of an array substrate for an LCD device according to a first embodiment of the present invention.
Figure 19:
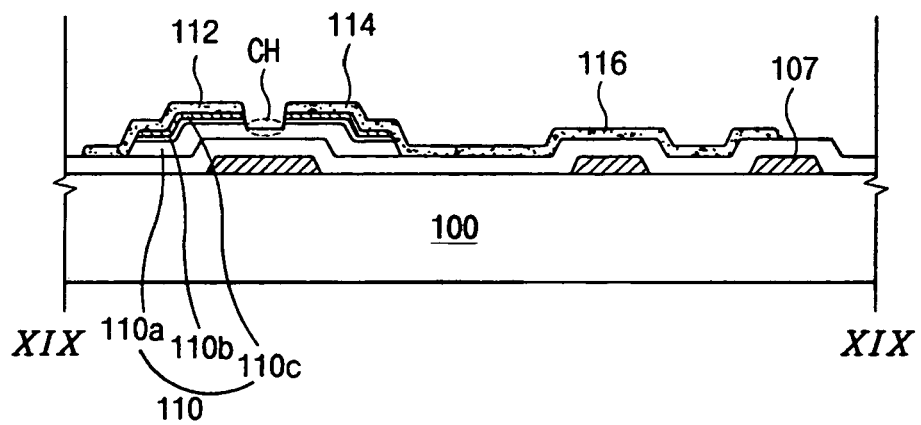
FIG. 19 is a schematic cross-sectional view showing a forming process of an array substrate for an LCD device according to a first embodiment of the present invention.

FIG. 18 is a schematic plan view showing a forming process of an array substrate for an LCD device according to a first embodiment of the present invention. FIG. 19 is a schematic cross-sectional view showing a forming process of an array substrate for an LCD device according to a first embodiment of the present invention. In FIG. 18 and FIG. 19, a source electrode 112 and a pixel electrode 116 of transparent material, preferably ITO, are formed on the substrate having the semiconductor layer 110 with an additional buffer layer. The pixel electrode 116 includes a drain electrode portion 114. The source electrode 112 and the drain electrode portion 114 are spaced apart from each other. Moreover, to increase the aperture ratio, the pixel electrode 116 overlaps a previous gate line 107. In this forming process, the buffer contacting and ohmic contact layers 100c and 100b between the source electrode 112 and drain electrode portion 114 are etched to expose the active layer 10a and form a channel "CH" of the TFT.

Figure 20:
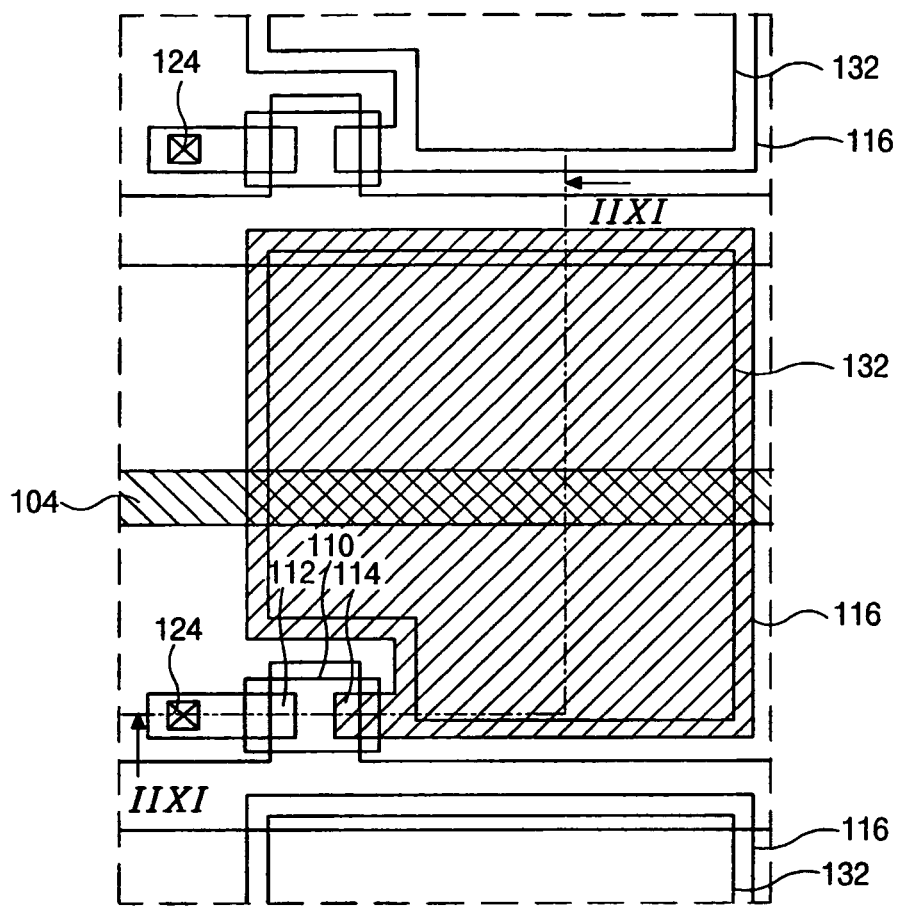
FIG. 20 is a schematic plan view showing a forming process of an array substrate for an LCD device according to a first embodiment of the present invention.
Figure 21:
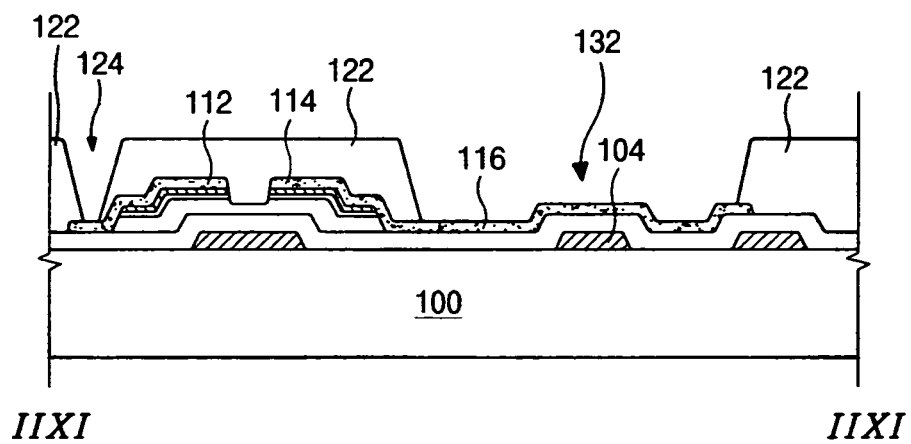
FIG. 21 is a schematic cross-sectional view showing a forming process of an array substrate for an LCD device according to a first embodiment of the present invention.

FIG. 20 is a schematic plan view showing a forming process of an array substrate for an LCD device according to a first embodiment of the present invention. FIG. 21 is a schematic cross-sectional view showing a forming process of an array substrate for an LCD device according to a first embodiment of the present invention. In FIG. 20 and FIG. 21, a passivation layer 122 having a first contact hole 124 and an open portion 132 is formed on the entire surface of the substrate. The first contact hole 124 and the open portion 132 expose the source electrode 112 and the pixel electrode 116, respectively. When a voltage is applied to the pixel electrode 116, the generated electric field drives the liquid crystal layer. Since the electric field to drive the liquid crystal layer can be reduced by the passivation layer 122, the passivation layer 122 on the pixel electrode 116 is eliminated. The passivation layer 122 is made of insulating material such as acrylic resin in a preferred embodiment.

Figure 22:
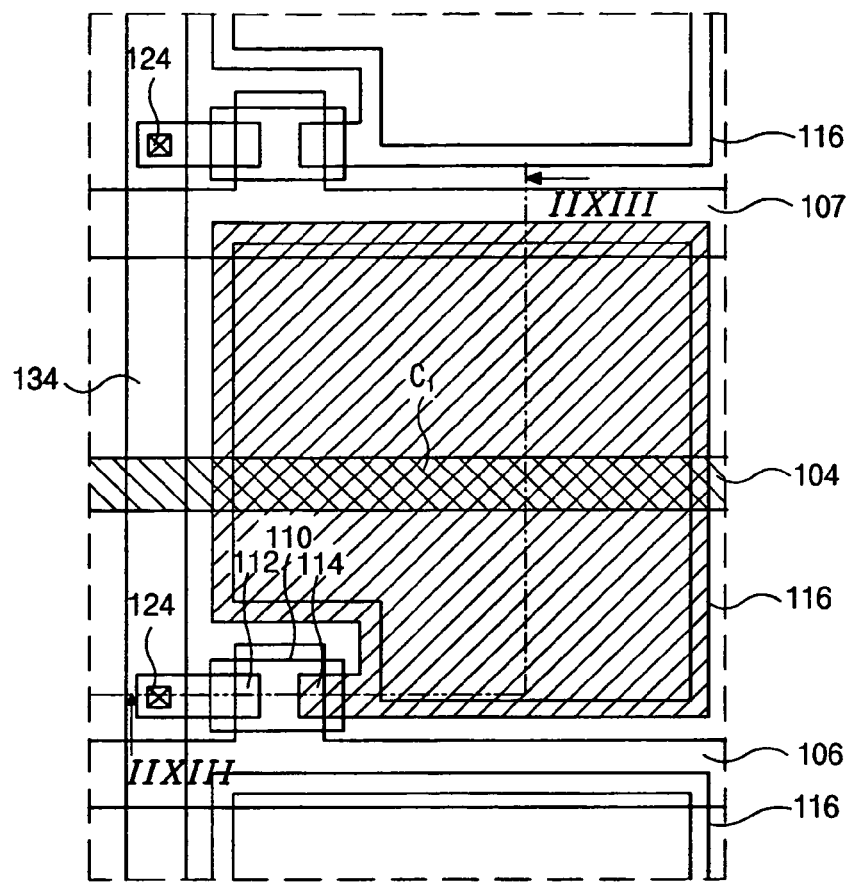
FIG. 22 is a schematic plan view showing a forming process of an array substrate for an LCD device according to a first embodiment of the present invention.
Figure 23:
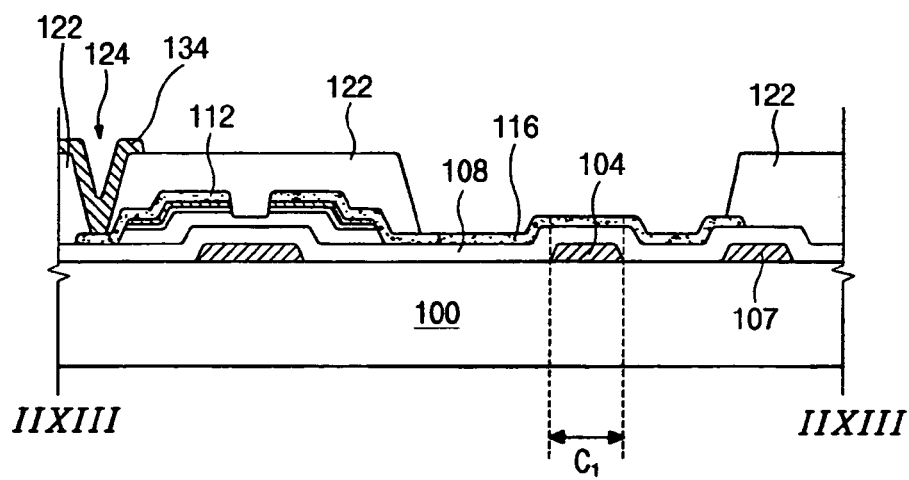
FIG. 23 is a schematic cross-sectional view showing a forming process of an array substrate for an LCD device according to a first embodiment of the present invention.

FIG. 22 is a schematic plan view showing a forming process of an array substrate for an LCD device according to a first embodiment of the present invention. FIG. 23 is a schematic cross-sectional view showing a forming process of an array substrate for an LCD device according to a first embodiment of the present invention. In FIG. 22 and FIG. 23, a data line 134 connected to the source electrode 112 through the first contact hole 124 is formed on the passivation layer 122. The data line 134 crossing the gate and common lines 106 and 104 is disposed along a column direction. Chemical-resistant metal such as molybdenum (Mo), nickel (Ni), chromium (Cr) and tungsten (W) can be used as the data line 134.

In the first embodiment, the storage capacitor "C1" is formed between the common line 104 and the pixel electrode 116 and only the gate insulating layer 108 is interposed therebetween. Therefore, an additional storage electrode 38 (of FIG. 2) is not necessary, and the storage capacitor having adequate capacitance can be formed without the reduction of the aperture ratio.

Figure 24:
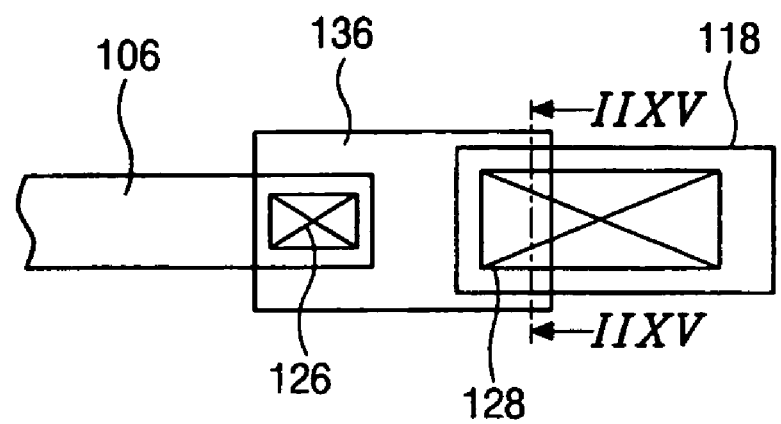
FIG. 24 is a schematic plan view of a gate pad of an array substrate for an LCD device according to a first embodiment of the present invention.
Figure 25:
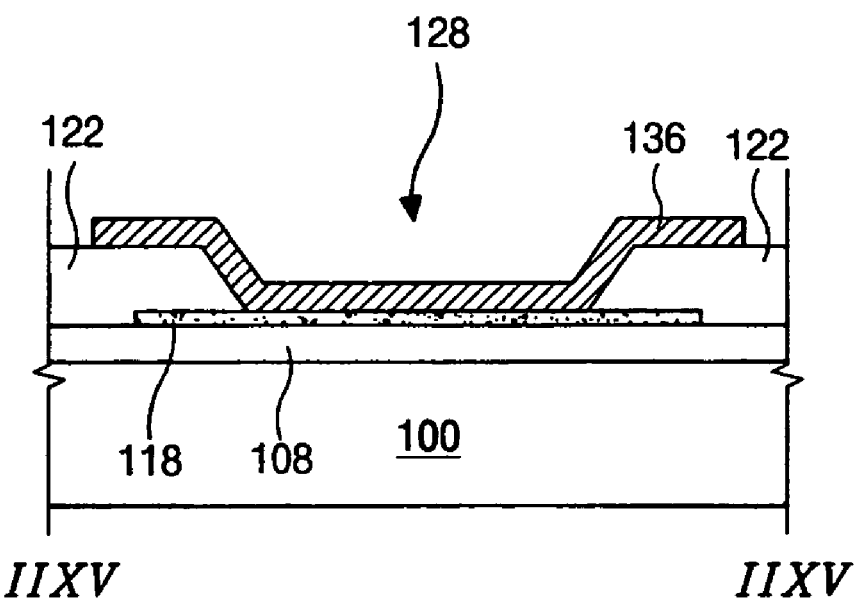
FIG. 25 is a schematic cross-sectional view of a gate pad of an array substrate for an LCD device according to a first embodiment of the present invention.

On the other hand, to connect the array substrate with an exterior circuit, a gate pad and a data pad are formed at the end of the gate and data lines, respectively. FIG. 24 is a schematic plan view of a gate pad of an array substrate for an LCD device according to a first embodiment of the present invention. FIG. 25 is a schematic cross-sectional view of a gate pad of an array substrate for an LCD device according to a first embodiment of the present invention.

In FIG. 24 and FIG. 25, a gate pad 118 is formed in a position spaced apart from an end of a gate line 106 and a gate link 136 overlapping the gate line 106. The gate link 136 is connected to the gate line 106 and the gate pad 118 through a second contact hole 126 and a third contact hole 128, respectively. The gate pad 118 is made of the same material as the pixel electrode 116 (of FIG. 18), i.e., transparent conductive material and the gate link 136 is made of the same material as the data line 134 (of FIG. 22). Since the transparent material is generally used as a material for pads, the gate pad can be made of the transparent material without additional processes. However, it is preferable that the gate link 136 is wider than the gate pad 118 to maintain a stable connection.

Figure 26:
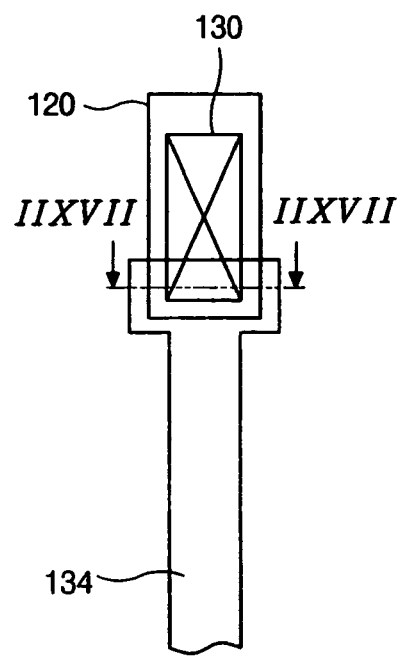
FIG. 26 is a schematic plan view of a data pad of an array substrate for an LCD device according to a first embodiment of the present invention.
Figure 27:
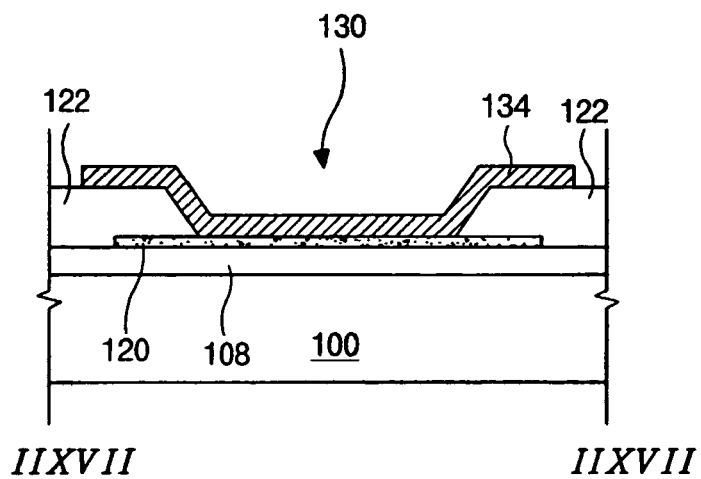
FIG. 27 is a schematic cross-sectional view of a data pad of an array substrate for an LCD device according to a first embodiment of the present invention.

FIG. 26 is a schematic plan view of a data pad of an array substrate for an LCD device according to a first embodiment of the present invention. FIG. 27 is a schematic cross-sectional view of a data pad of an array substrate for an LCD device according to a first embodiment of the present invention. In FIG. 26 and FIG. 27, a data pad 120 overlapping a data line 134 is formed at an end of the a data line 134. Since the data pad 120 is formed during the forming process of the gate pad 118 (of FIG. 24), the data line 134 is formed after forming the data pad 120. Same as for the gate pad 118 (of FIG. 24), it is preferable that the end of data line 134 is wider than the data pad 120 to ensure a stable connection. The data line 134 is connected to the data pad 120 through a fourth contact hole 130. In the aforementioned forming processes according to the first embodiment of the present invention, the gate and data pads can be formed without any additional processes.

Second Embodiment

Figure 28:
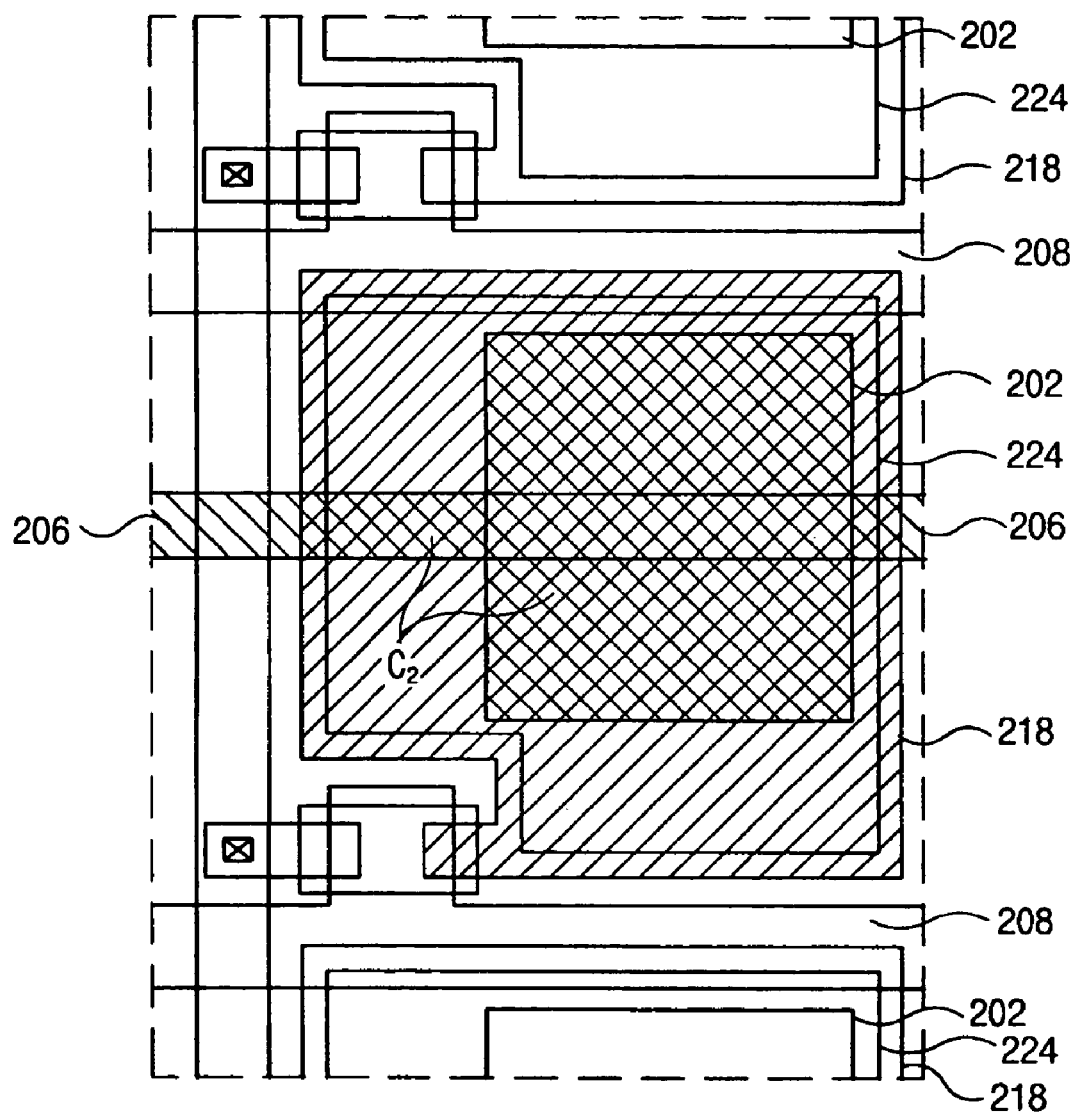
FIG. 28 is a schematic plan view of an array substrate for an LCD device according to a second embodiment of the present invention.

FIG. 29 to FIG. 36 are schematic views showing forming processes of an array substrate for an LCD device according to a second embodiment of the present invention. FIG. 28 is a schematic plan view of an array substrate for an LCD device according to a second embodiment of the present invention. In FIG. 28, a storage capacitor "C2" is formed between a common electrode 202 and a pixel electrode 218 and between a common line 206 and a pixel electrode 218. A gate insulating layer is interposed therebetween. The common electrode 202 is made of transparent conductive material and contacts the common line 206. The common line 206 is parallel to a gate line 208 and spaced apart from the gate line 208. The pixel electrode 218 of transparent conductive material is disposed in a pixel region and overlaps a previous gate line 209.

A passivation layer includes an open portion 224 exposing the pixel electrode 218. The TFT, the gate and data lines, and the gate and data pads of the second embodiment are formed by the same or similar processes as those described with respect to the aforementioned first embodiment. In the second embodiment, since the common electrode of transparent conductive material is used as one electrode of the storage capacitor, adequate storage capacitance can be achieved without a reduction of the aperture ratio.

Figure 29:
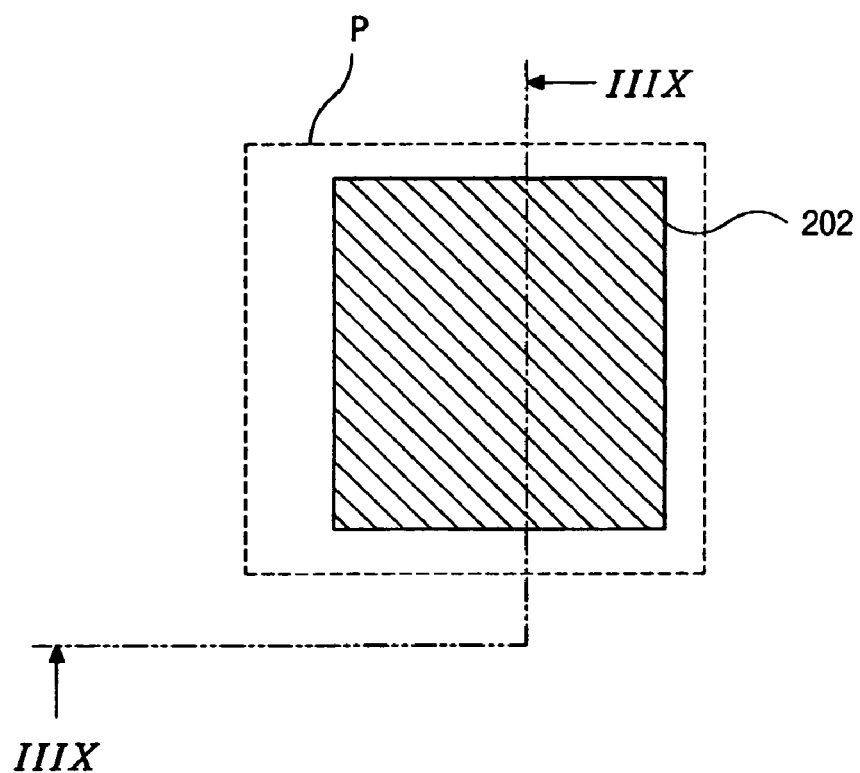
FIG. 29 is a schematic plan view showing a forming process of an array substrate for an LCD device according to a second embodiment of the present invention.
Figure 30:
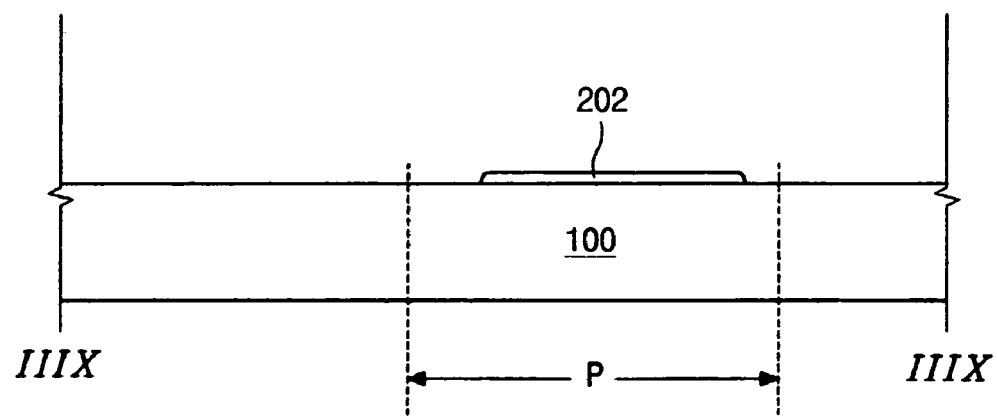
FIG. 30 is schematic cross-sectional view showing a forming process of an array substrate for an LCD device according to a second embodiment of the present invention.

FIG. 29 is a schematic plan view showing a forming process of an array substrate for an LCD device according to a second embodiment of the present invention. FIG. 30 is schematic cross-sectional view showing a forming process of an array substrate for an LCD device according to a second embodiment of the present invention. In FIG. 29 and FIG. 30, a common electrode 202 of transparent conductive material such as ITO is formed on a substrate 100 in a pixel region. Since the common electrode 202 is transparent, an area of the common electrode 202 can be enlarged to acquire the desired storage capacitance.

Figure 31:
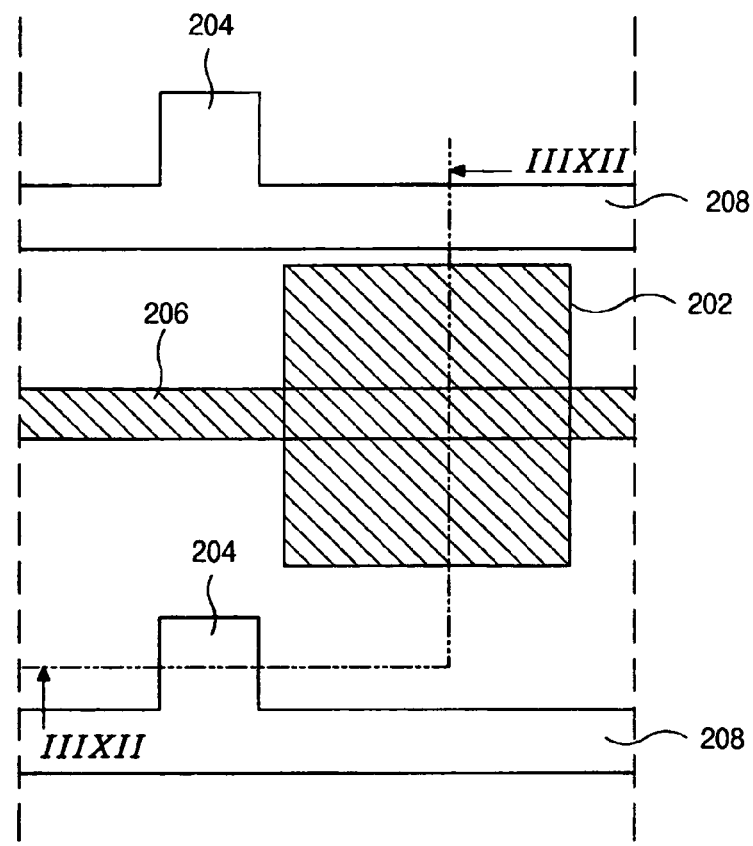
FIG. 31 is a schematic plan view showing a forming process of an array substrate for an LCD device according to a second embodiment of the present invention.
Figure 32:
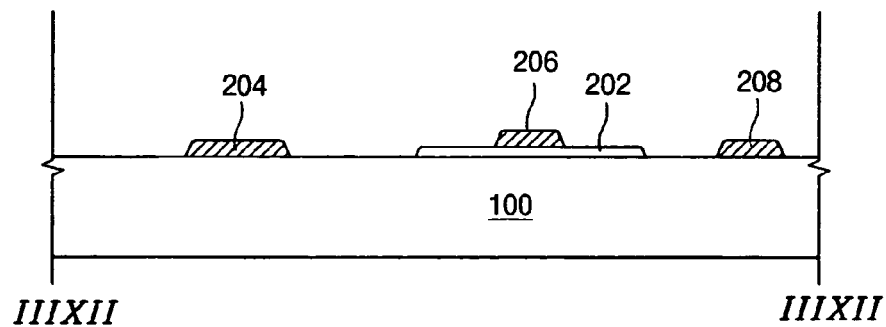
FIG. 32 is schematic cross-sectional view showing a forming process of an array substrate for an LCD device according to a second embodiment of the present invention.

FIG. 31 is a schematic plan view showing a forming process of an array substrate for an LCD device according to a second embodiment of the present invention. FIG. 32 is schematic cross-sectional view showing a forming process of an array substrate for an LCD device according to a second embodiment of the present invention. In FIG. 31 and FIG. 32, a gate line 208 having a gate electrode 204 and a common line 206 are formed along a row direction on the substrate 100 having the common electrode 202. The common line 206 parallel to gate line 208 is spaced apart from the gate line 208 and contacts the common electrode 202. Accordingly, the common voltage of the common line 206 can be applied to the common electrode 202.

Figure 33:
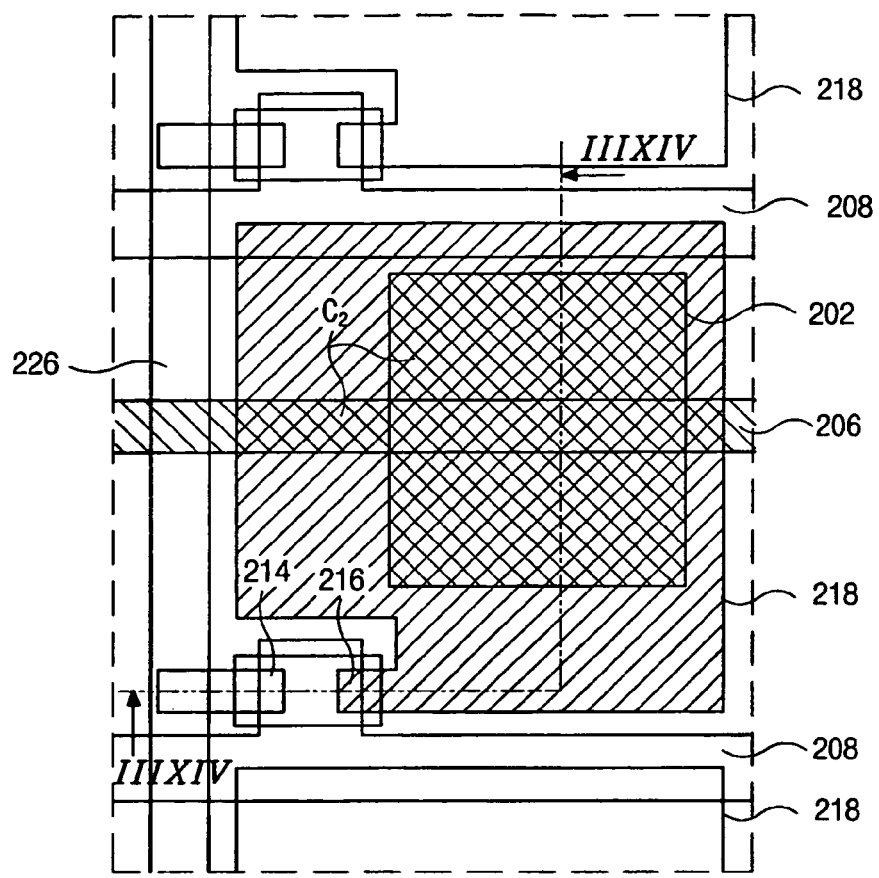
FIG. 33 is a schematic plan view showing a forming process of an array substrate for an LCD device according to a second embodiment of the present invention.
Figure 34:
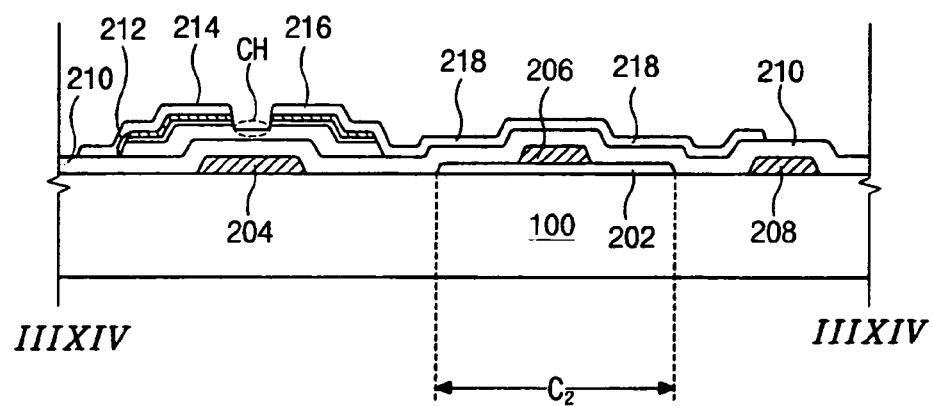
FIG. 34 is schematic cross-sectional view showing a forming process of an array substrate for an LCD device according to a second embodiment of the present invention.

FIG. 33 is a schematic plan view showing a forming process of an array substrate for an LCD device according to a second embodiment of the present invention. FIG. 34 is schematic cross-sectional view showing a forming process of an array substrate for an LCD device according to a second embodiment of the present invention. In FIG. 33 and FIG. 34, a gate insulating layer 210 is formed on the entire surface of the substrate 100 having the gate and common lines 208 and 206. Next, a semiconductor layer 212 with a buffer contacting layer of Ti or Mo is formed on the gate insulating layer 210. Then, a source electrode 214 and a pixel electrode 218 of transparent material are formed on the substrate having the semiconductor layer 212 with a buffer contacting layer.

The pixel electrode 218 includes a drain electrode portion 216 and the source electrode 214 is spaced apart from the drain electrode portion 216. In this forming process, a gate insulating layer 210, the semiconductor layer 212 and a channel "CH" is formed by the same process as that described with respect to the first embodiment.

Figure 35:
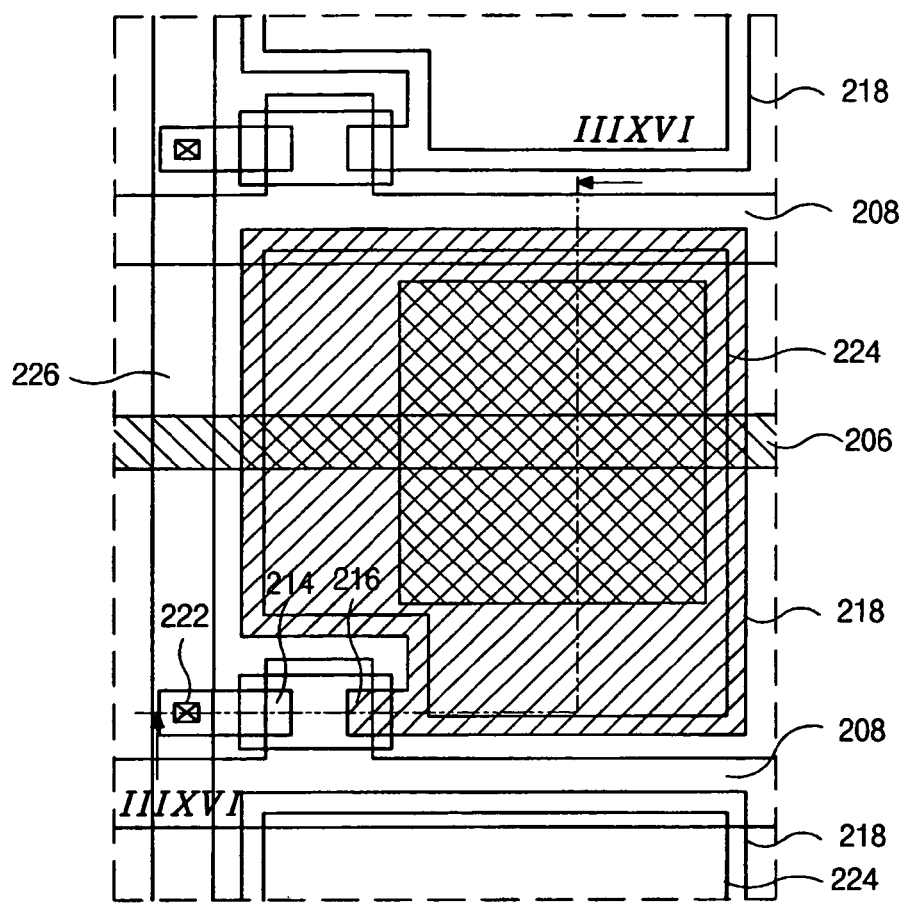
FIG. 35 is a schematic plan view showing a forming process of an array substrate for an LCD device according to a second embodiment of the present invention.
Figure 36:
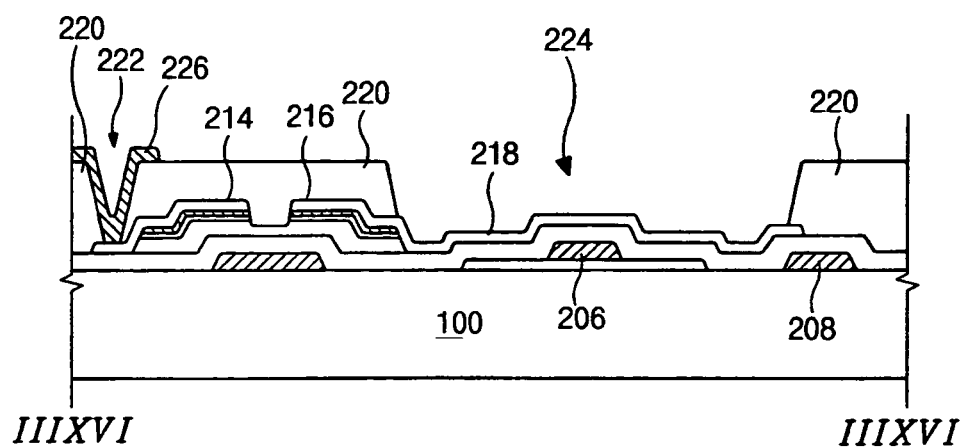
FIG. 36 is schematic cross-sectional view showing a forming process of an array substrate for an LCD device according to a second embodiment of the present invention.

FIG. 35 is a schematic plan view showing a forming process of an array substrate for an LCD device according to a second embodiment of the present invention. FIG. 36 is schematic cross-sectional view showing a forming process of an array substrate for an LCD device according to a second embodiment of the present invention. In FIG. 35 and FIG. 36, a passivation layer 220 having a first contact hole 222 and an open portion 224 is formed on the entire surface of the substrate. Then, a data line 226 connected to the source electrode 214 through the first contact hole 222 is formed on the passivation layer 220. The data line 226 crossing the gate and the common lines 208 and 206 is disposed along a column direction.

In the second embodiment, since the common electrode 202 is made of transparent conductive material, the increase of the area of the common electrode 202 does not reduce the aperture ratio. Therefore, the storage capacitor "C2" between the common and the pixel electrodes 202 and 218 can have a larger capacitance. Accordingly, the array substrate having a high aperture ratio is achieved without a reduction of storage capacitance. For the gate and data pads, the same structure as the first embodiment can be applied to the second embodiment.

Third Embodiment

Figure 37:
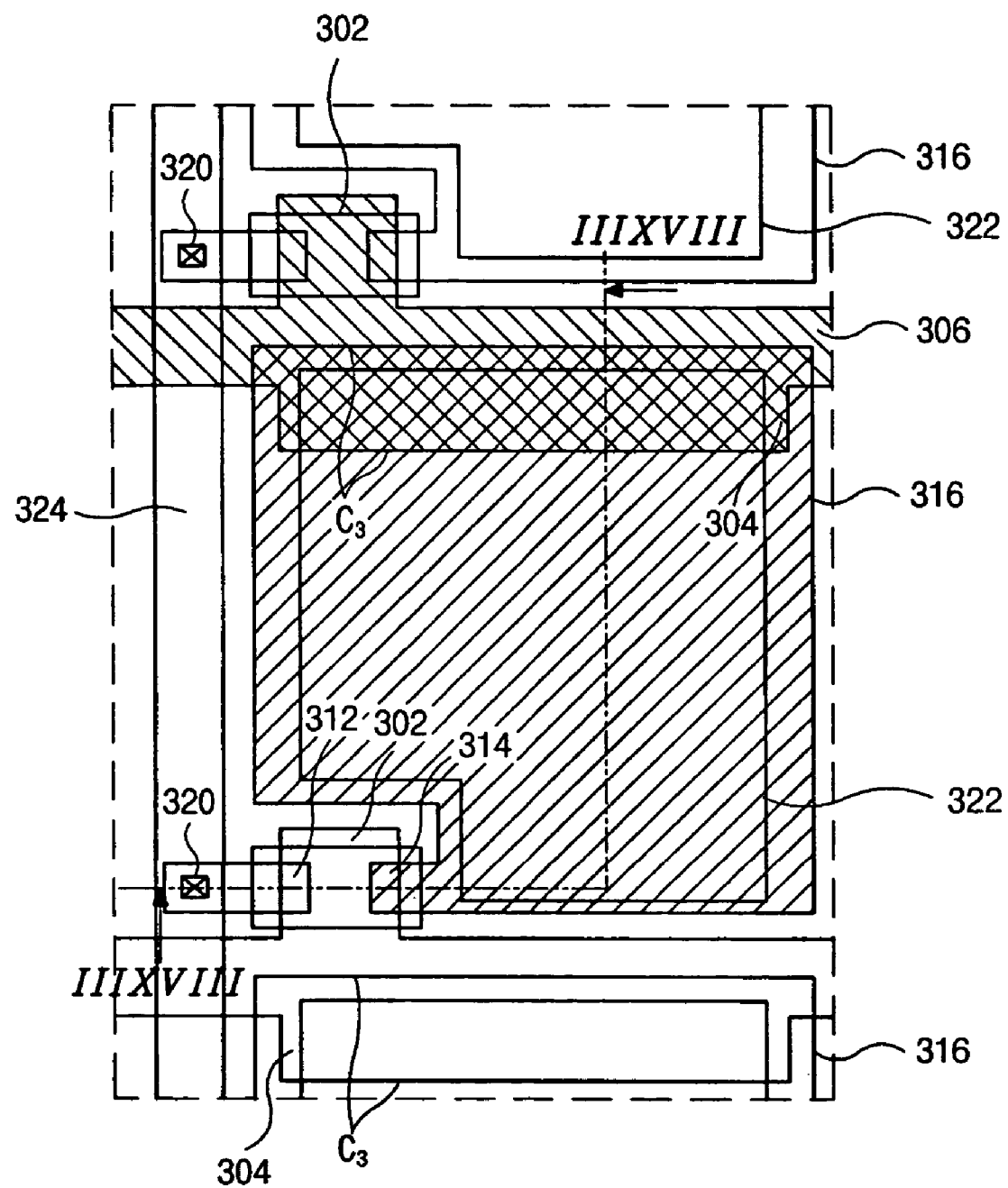
FIG. 37 is a schematic plan view of an array substrate for an LCD device according to a third embodiment of the present invention.

FIG. 37 is a schematic plan view of an array substrate for an LCD device according to a third embodiment of the present invention. In FIG. 37, a gate line 306 having a gate electrode 302 and a storage electrode 304 is formed along a row direction. A pixel electrode 316, including the drain electrode portion 314, overlaps the storage electrode 304. A source electrode 312 is spaced apart from the drain electrode portion 314. A data line 324 is formed along a column direction and is connected to the source electrode 312 through the first contact hole 320. A passivation layer has an open portion 322 exposing the pixel electrode 316.

In the third embodiment, the storage capacitor "C3" is formed between the storage and pixel electrodes 304 and 316 and a gate insulating layer is interposed therebetween. Since the opaque common line is not used, the aperture ratio is improved when compared with that of the common type storage capacitor. Moreover, the storage capacitance is improved compared with that of the conventional previous gate storage capacitors since only the gate insulating layer is interposed between the storage and pixel electrodes.

Figure 38:
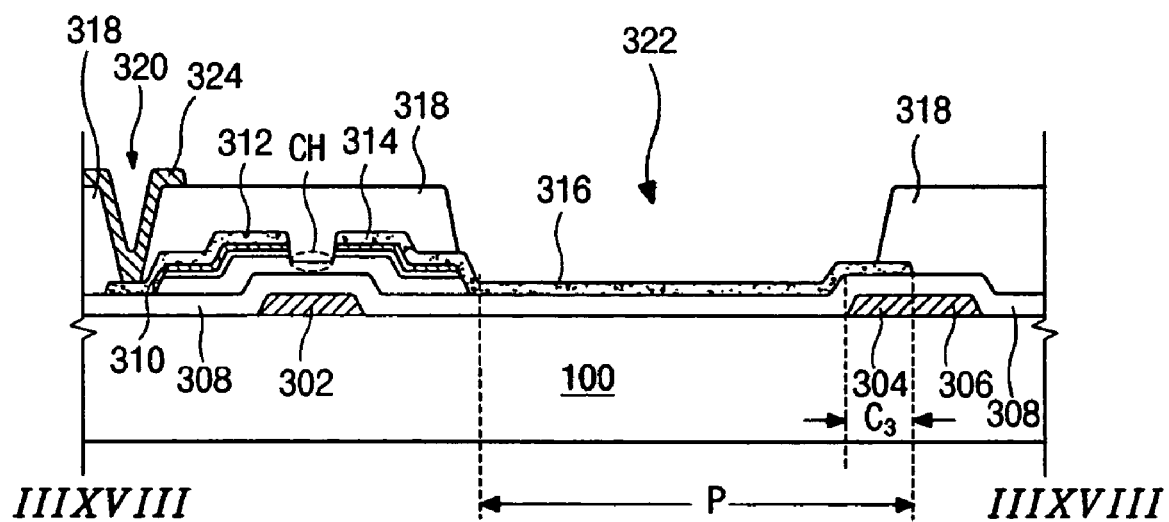
FIG. 38 is a cross-sectional view taken along a line "IIIXVIII-IIIXVIII" of FIG. 37.

FIG. 38 is a cross-sectional view taken along a line "IIIXVIII-IIIXVIII" of FIG. 37. In FIG. 38, a gate line 306 having a gate electrode 302 and a storage electrode 304 is formed on a substrate 100. After forming a gate insulating layer 308 on the entire surface of the substrate 100, a semiconductor layer 310 with a buffer contacting layer of Ti or Mo is formed thereon. Then, a source electrode 312 and a pixel electrode 316 of transparent conductive material are formed on the substrate 100 having the semiconductor layer 310 with a buffer contacting layer. The pixel electrode 316 includes a drain electrode portion 314 and the source electrode 312 overlapping the semiconductor layer 310 are spaced apart from the drain electrode portion 314. In this forming process of the source electrode 312 and the drain electrode portion 314, a channel "CH" is formed between the source electrode 312 and the drain electrode portion 314.

A passivation layer 318 having a first contact hole 320 and an open portion 322 is formed on the entire surface of the substrate 100. The first contact hole 320 and the open portion 322 expose the source and pixel electrodes 312 and 316, respectively. Finally, a data line 324 connected to the source electrode 312 through the first contact hole 320 is formed on the passivation layer 318. The gate and data lines 306 and 324 are formed along a row and column directions, respectively. Moreover, for the gate and data pads at the ends of the gate and data lines, the same structure as the first embodiment can be applied to the third embodiment.

In the third embodiment, the storage electrode 304 is elongated from the gate line 306 to the pixel region "P" and the storage capacitor "C3" is formed between the storage and pixel electrodes 304 and 316 with the gate insulating layer 308 interposed therebetween. Since the opaque common line is not used, the aperture ratio is improved compared with that of the common type storage capacitor. Moreover, the storage capacitance is improved compared with that of the conventional previous gate type since only the gate insulating layer is interposed between the storage and pixel electrodes.

Consequently, in the array substrate of common type according to the present invention, the common electrode is simultaneously formed in the forming process of the gate line and the pixel electrode is simultaneously formed in the forming process of the source electrode and the drain electrode portion. Since only the gate insulating layer, e.g. thinner than the passivation layer, is interposed between the common line and the pixel electrode, the storage capacitance is increased without reduction of aperture ratio.

In another aspect, the common electrode of transparent conductive material contacting the common line is used as one electrode of the storage capacitor so that the storage capacitance can be more improved. In the array substrate of previous gate type according to the present invention, since only the gate insulating layer is interposed between the storage electrode of the previous gate line and the pixel electrode, the storage capacitance is improved more than that of the conventional array substrate of the previous type and the aperture ratio is improved more than that of the conventional array substrate of the common type without reduction of the storage capacitance.

It will be apparent to those skilled in the art that various modifications and variations can be made in an array substrate and a manufacturing method thereof according to the present invention without departing from the spirit or scope of the invention. Thus, it is intended that the present invention covers the modifications and variations of this invention provided they come within the scope of the following claims and their equivalents.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An array substrate of a liquid crystal display device, comprising:
    a substrate;
    gate line disposed along a first direction on the substrate, the gate line including a storage electrode;
    a gate insulating layer on the gate line;
    a semiconductor layer on the gate insulating layer, wherein the semiconductor layer includes an active layer of amorphous silicon, an ohmic contact layer of doped amorphous silicon and a metal buffer layer of titanium or chromium;
    a pixel electrode of transparent conductive material and overlapping the gate line;
    a drain electrode of transparent conductive material and overlapping the semiconductor layer;
    a source electrode of transparent conductive material spaced apart from the drain electrode, the source electrode and the drain electrode being a single layer, a portion of the active layer between the source electrode and the drain electrode being exposed;
    a passivation layer including a first contact hole and an open portion, the first contact hole exposing the source electrode and the open portion exposing the pixel electrode, respectively; and
    a data line disposed along a second direction on the passivation layer, the data line connected to the source electrode through the first contact hole and crossing the gate line,
    wherein the source electrode is larger than a portion of the semiconductor layer corresponding to the source electrode so that a portion of the source electrode in the first contact hole is disposed between, and in direct contact with both of, the gate insulating layer and the data line.

2. The array substrate according to claim 1, further comprising a gate link and a gate pad at an end portion of the gate line,
    the gate link being made of the same material as the data line and overlapping the gate line and the gate pad,
    the gate line being connected to the gate link through a second contact hole in the gate insulating layer and the passivation layer, and
    the gate pad being made of the same material as the pixel electrode and connected to the gate link through a third contact hole in the passivation layer.

3. The array substrate according to claim 2, wherein the gate link is wider than the gate pad.

4. The array substrate according to claim 1, further comprising a data pad at an end portion of the data line, the data pad overlapping the data line and being made of the same material as the pixel electrode and connected to the data line through a fourth contact hole.

5. The array substrate according to claim 4, wherein the overlapped data line is wider than the data pad.

6. The array substrate according to claim 1, said pixel electrode overlapping the gate line.

7. The array substrate according to claim 1, wherein the first contact hole is disposed under the data line.

8. The array substrate according to claim 1, wherein the transparent material is indium tin oxide.

9. The array substrate according to claim 1, wherein the passivation layer is made of acrylate resin.

10. The array substrate according to claim 1, wherein the pixel electrode and the drain electrode are an integral, unitary structure, and the pixel electrode, the drain electrode and the source electrode are made of a same material.

11. The array substrate according to claim 1, wherein the metal buffer layer is located between the drain electrode and the ohmic contact layer and between the source electrode and the ohmic contact layer.

12. A fabricating method of an array substrate of a liquid crystal display device, comprising:

forming a gate line disposed along a first direction on a substrate, the gate line including a storage electrode;

forming a gate insulating layer on the gate line;

forming a semiconductor layer on the gate insulating layer by forming an active layer of amorphous silicon, an ohmic contact layer of doped amorphous silicon and a metal buffer layer of titanium or chromium;

forming a source electrode, a drain electrode and a pixel electrode of transparent conductive material, the source electrode spaced apart from the drain electrode, the drain electrode overlapping the semiconductor layer and the pixel electrode overlapping the gate line, respectively, the source electrode and the drain electrode being a single layer, a portion of the active layer between the source electrode and the drain electrode being exposed;

forming a passivation layer including a first contact hole and an open portion, the first contact hole exposing the source electrode and the open portion exposing the pixel electrode, respectively; and forming a data line disposed along a second direction on the passivation layer, the data line connected to the source electrode through the first contact hole and crossing the gate line, wherein the source electrode is larger than a portion of the semiconductor layer corresponding to the source electrode so that a portion of the source electrode in the first contact hole is disposed between, and in direct contact with both of, the gate insulating layer and the data line.

13. The method according to claim 12, further comprising:

forming a gate link and a gate pad at an end portion of the gate line, the gate link being made of the same material as the data line and overlapping the gate line and the gate pad, the gate line being connected to the gate link through a second contact hole in the gate insulating layer and the passivation layer, and the gate pad being made of the same material as the pixel electrode and connected to the gate link through a third contact hole in the passivation layer.

14. The method according to claim 13, wherein the gate link is wider than the gate pad.

15. The method according to claim 12, further comprising:

forming a data pad at an end portion of the data line, the data pad overlapping the data line and being made of the same material as the pixel electrode and connected to the data line through a fourth contact hole.

16. The method according to claim 15, wherein the overlapped data line is wider than the data pad.

17. The method according to claim 12, said pixel electrode overlapping the gate line.

18. The method according to claim 12, wherein the first contact hole is disposed under the data line.

19. The method according to claim 12, wherein the transparent material is indium tin oxide.

20. The method according to claim 12, wherein the passivation layer is made of acrylate resin.

21. The method according to claim 12, wherein the step of forming the source electrode, the drain electrode and the pixel electrode includes forming the pixel electrode and the drain electrode as an integral, unitary structure and forming the pixel electrode, the drain electrode and the source electrode of a same material.

22. The method according to claim 12, wherein the metal buffer layer is formed between the drain electrode and the ohmic contact layer and between the source electrode and the ohmic contact layer.

* * * * *